Figure 1:
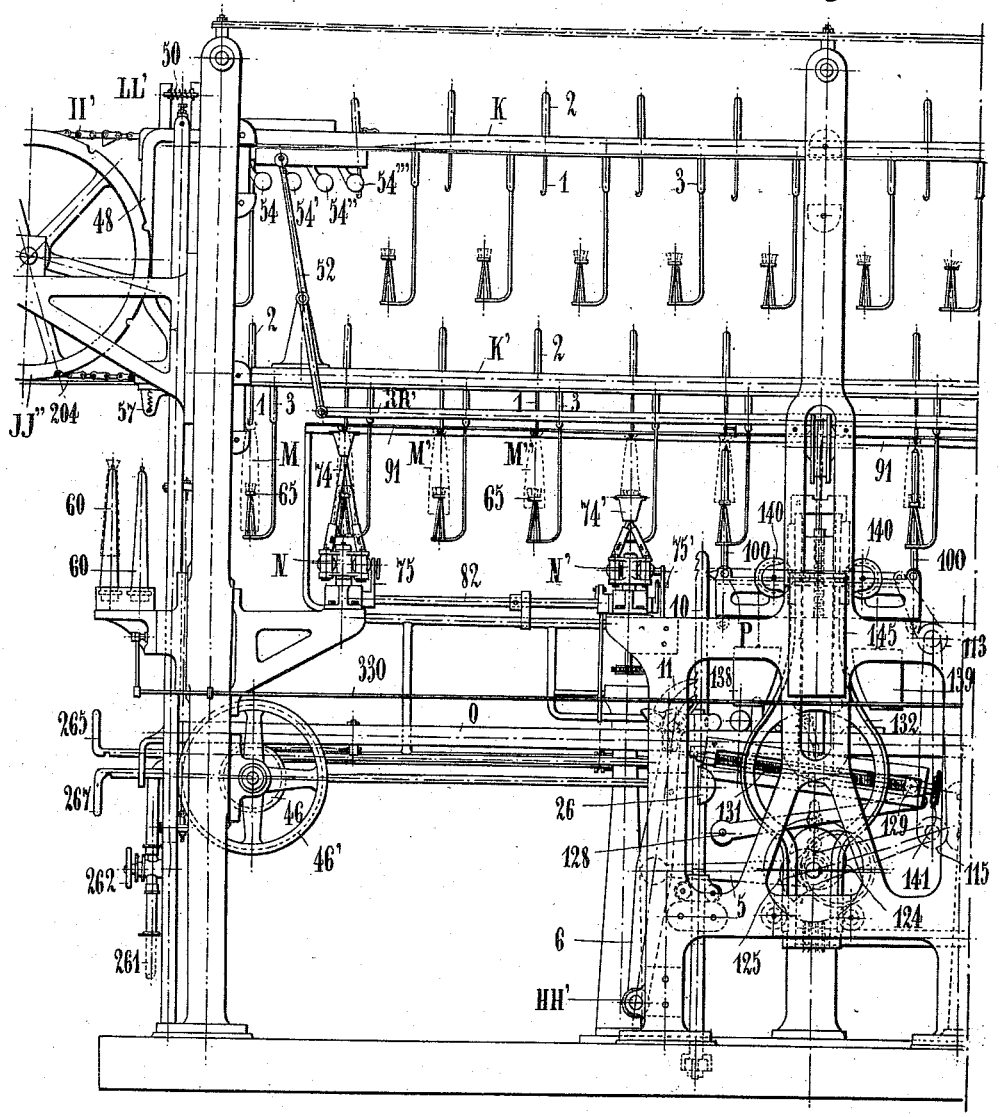

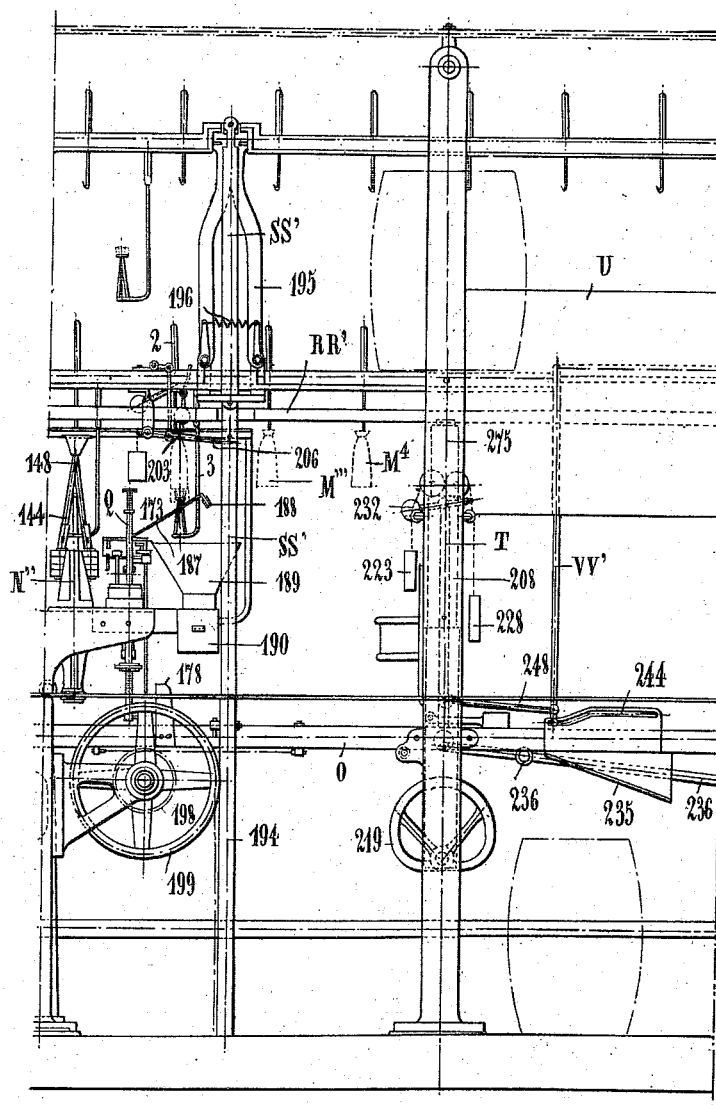

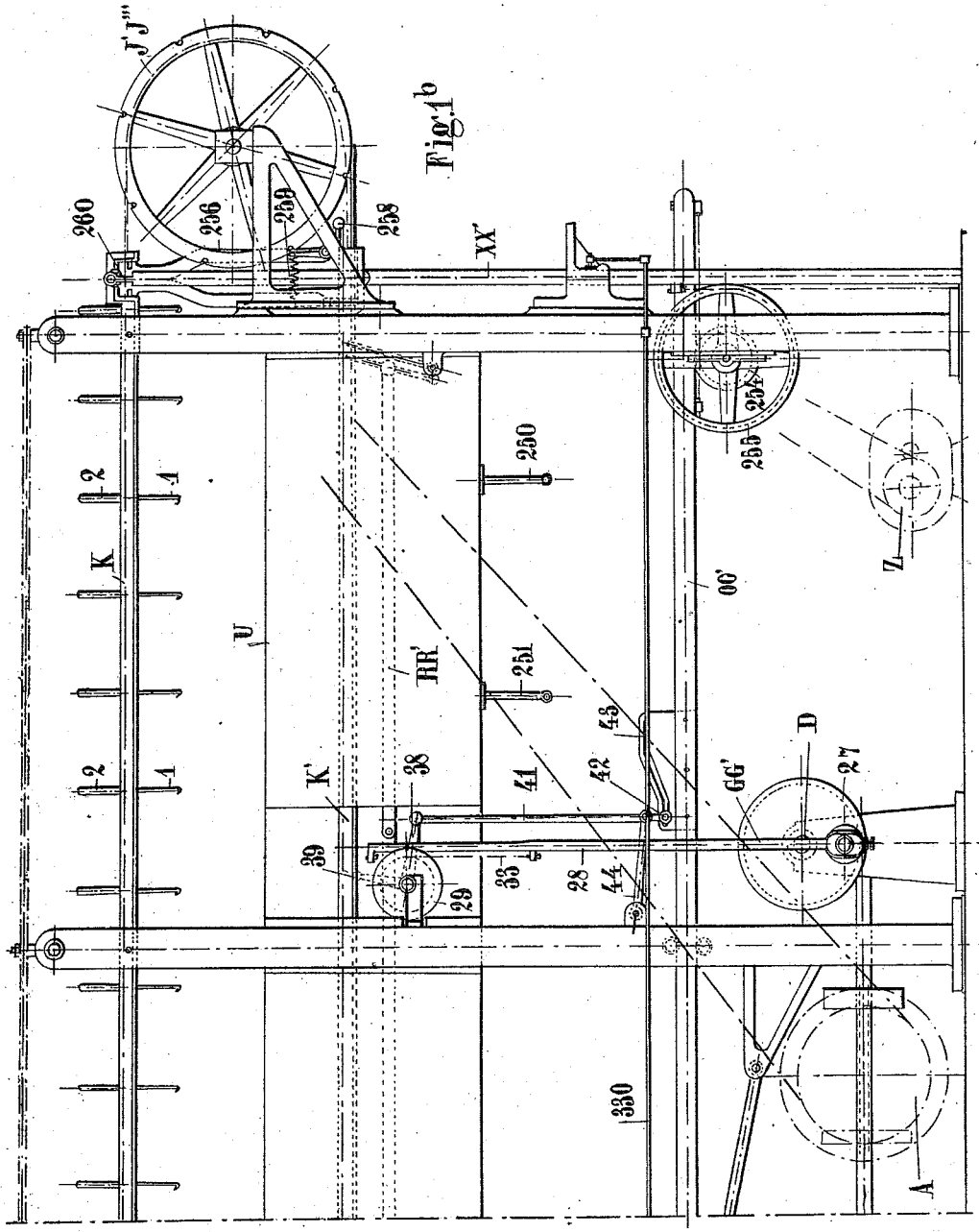

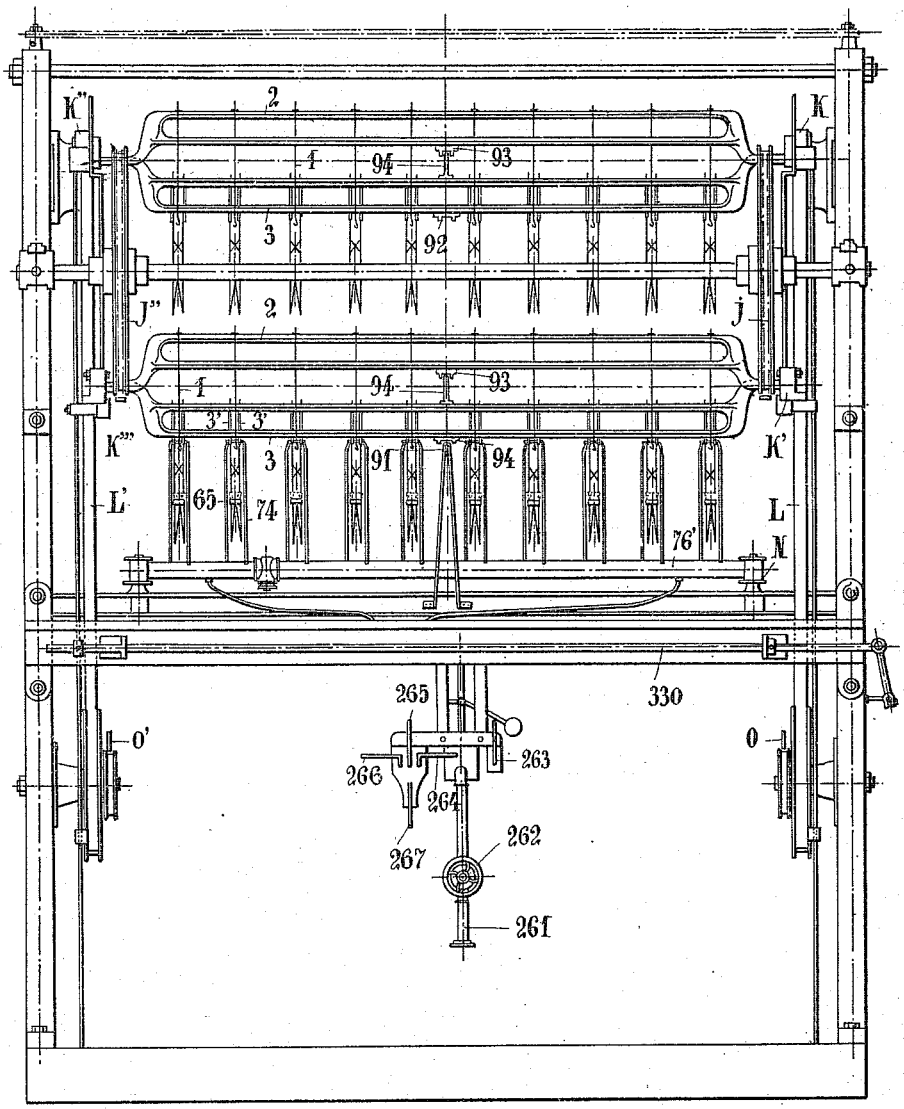

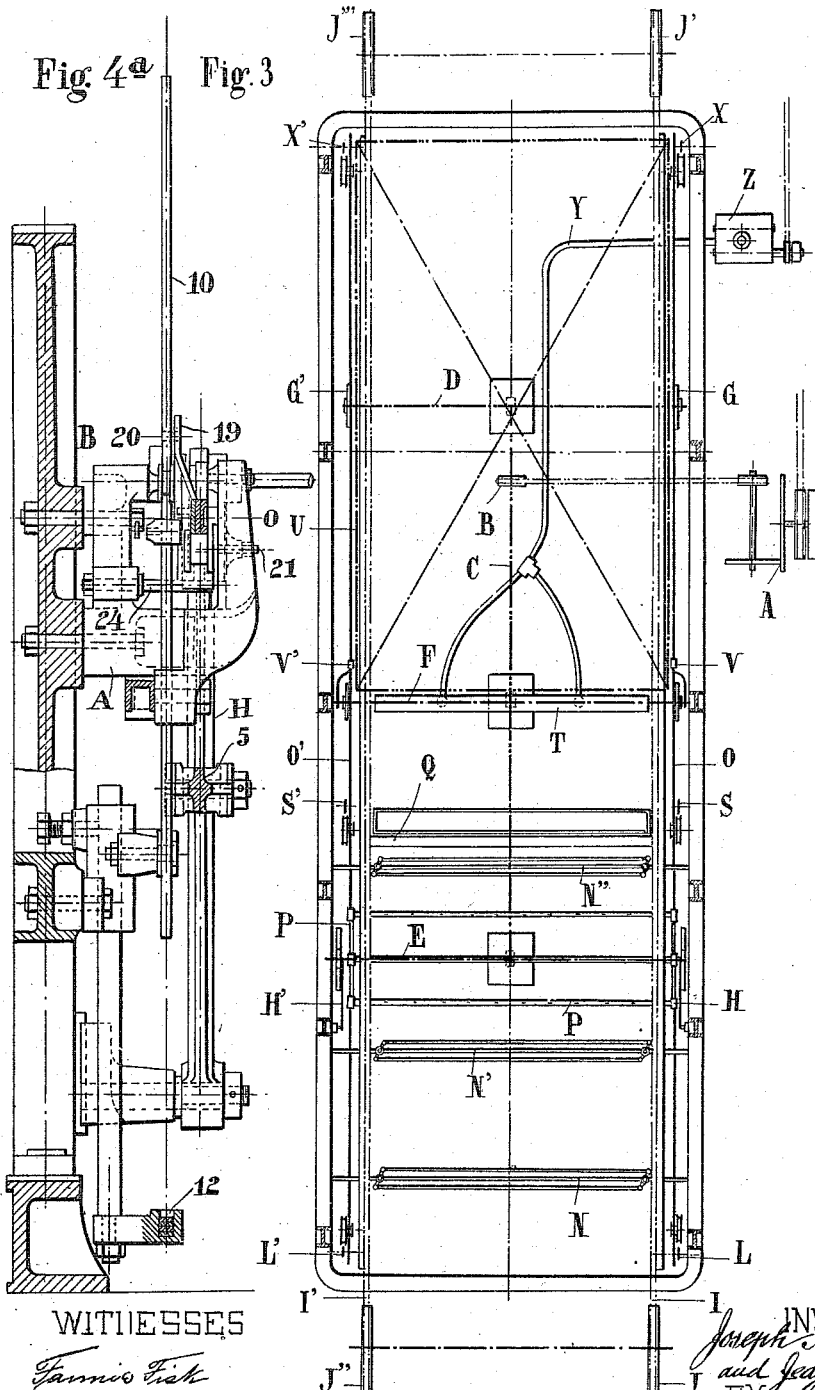

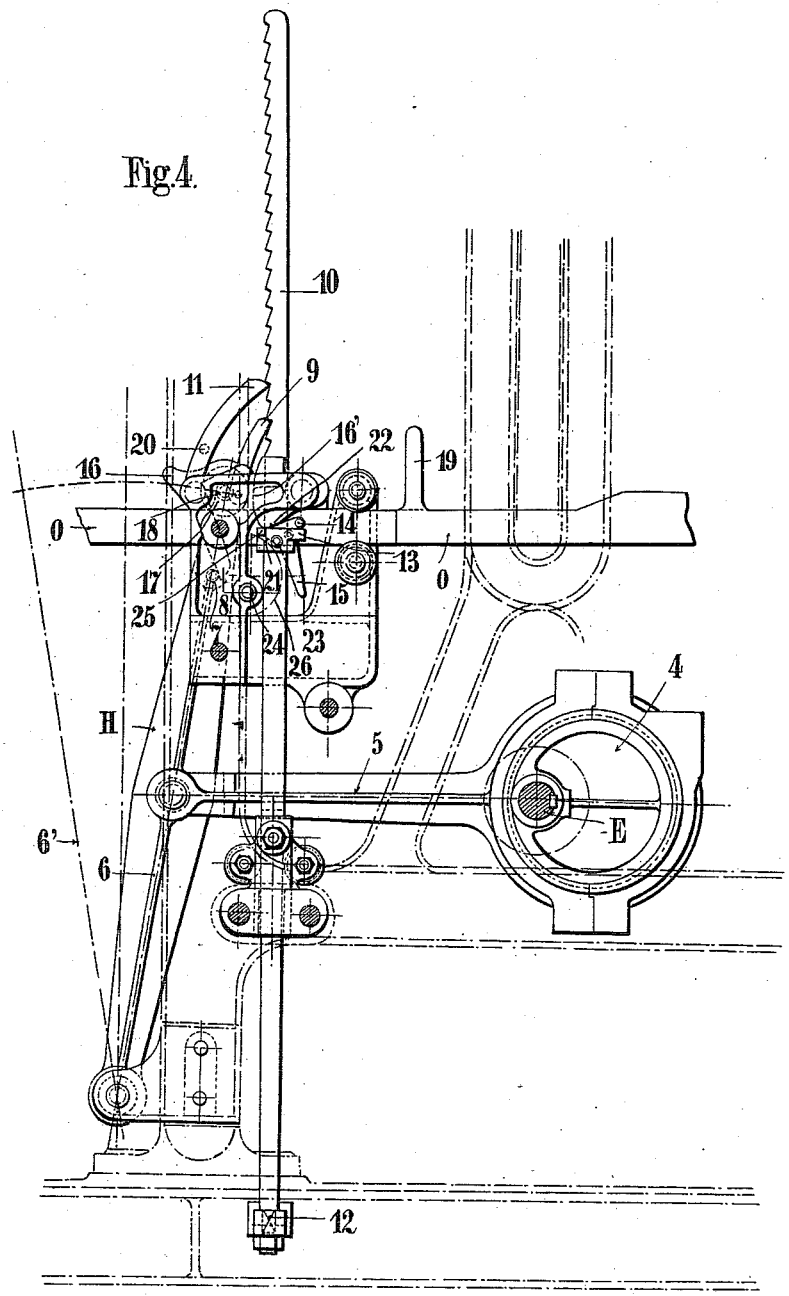

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 7.
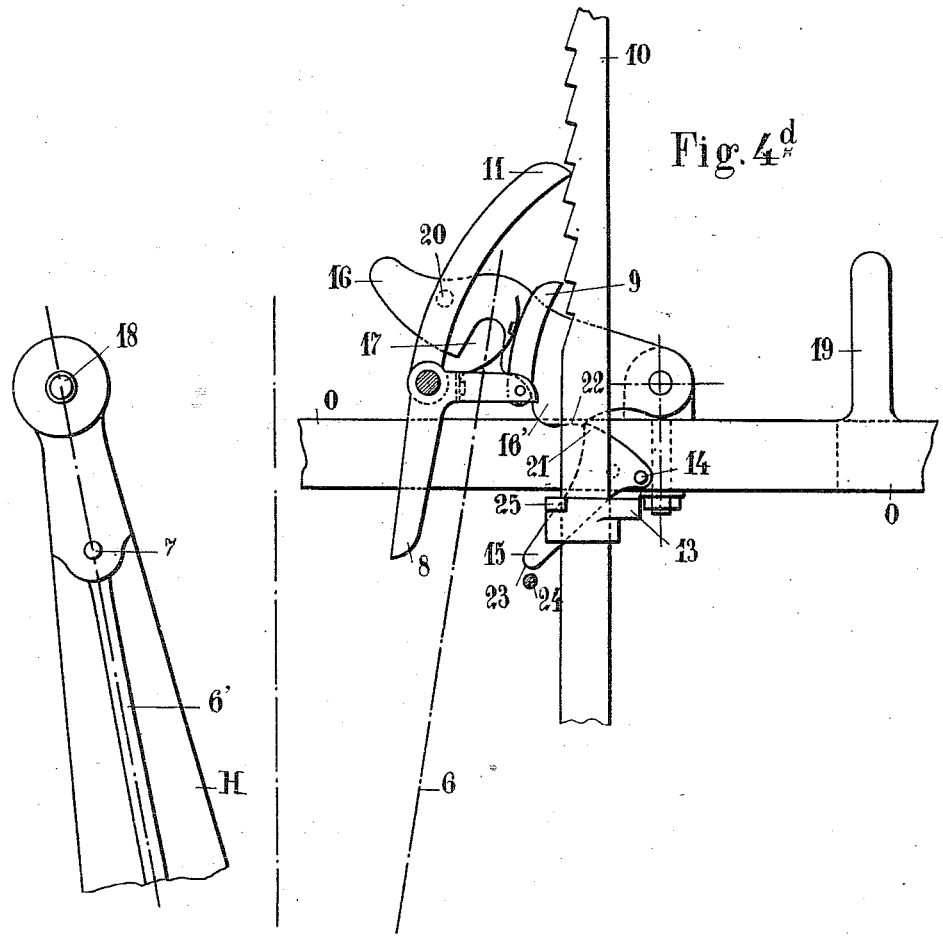
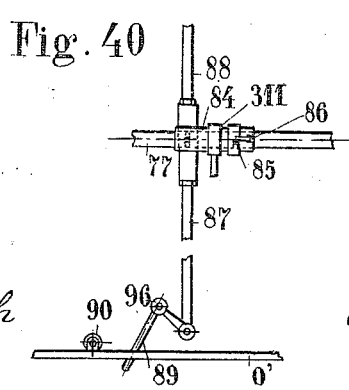
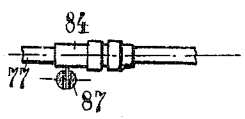
WITNESSES
John Murtagh
L. J. Murphy
INVENTORS
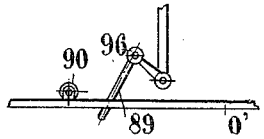
BY
Goepel
ATTORNEYS J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 8.
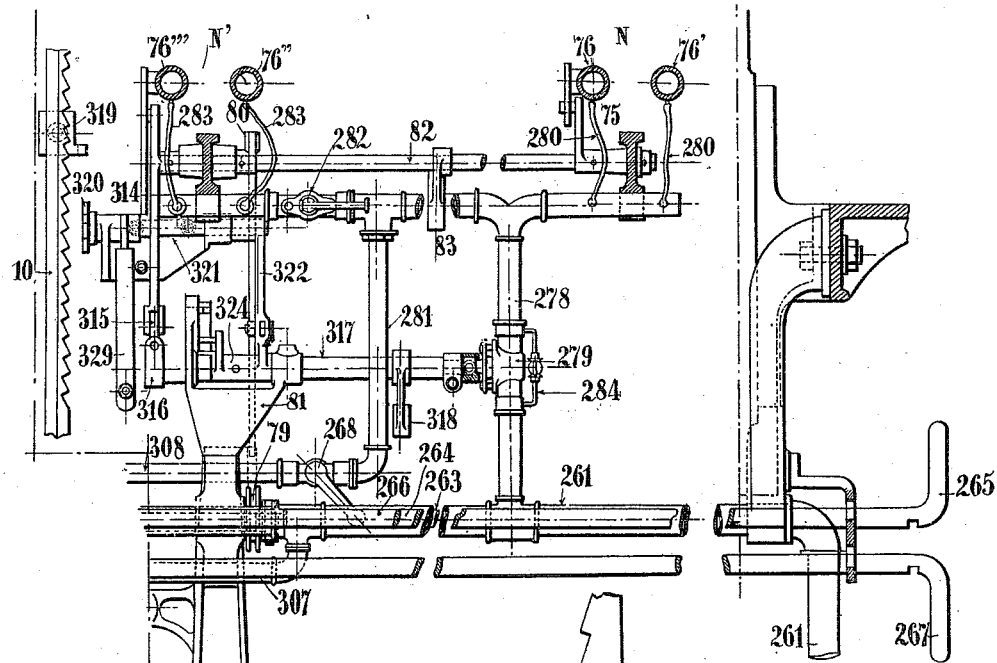
Fig. 37ᵃ
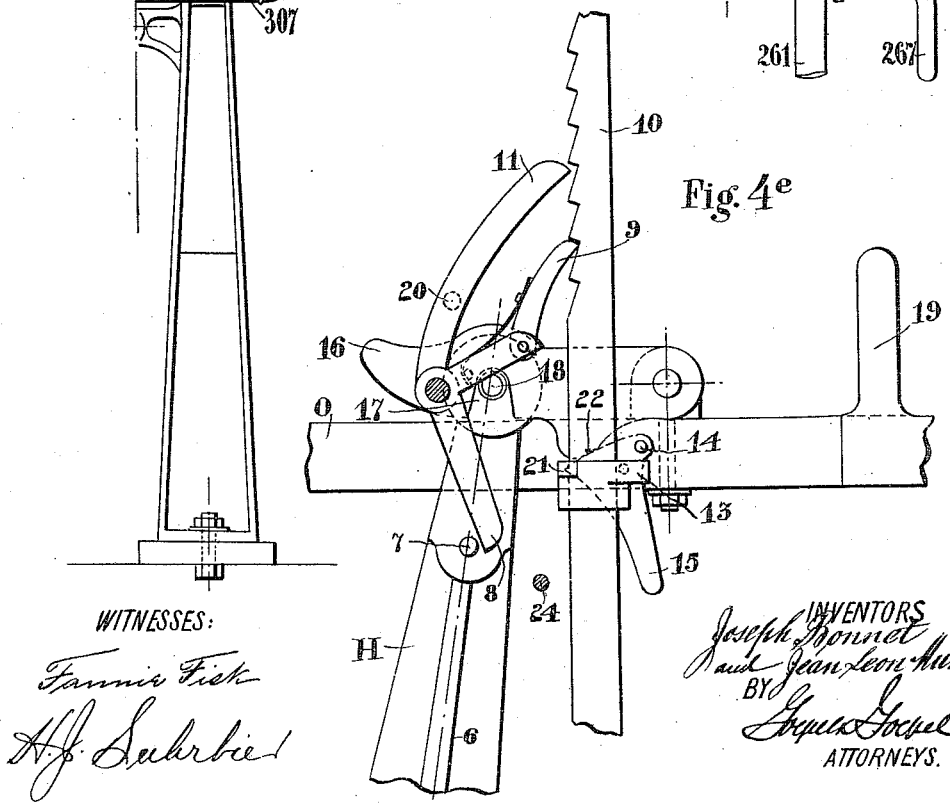
Fig. 4ᵉ
WITNESSES:
INVENTORS
Joseph Bonnet
and Jean Leon Muller
BY
ATTORNEYS.

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 9.
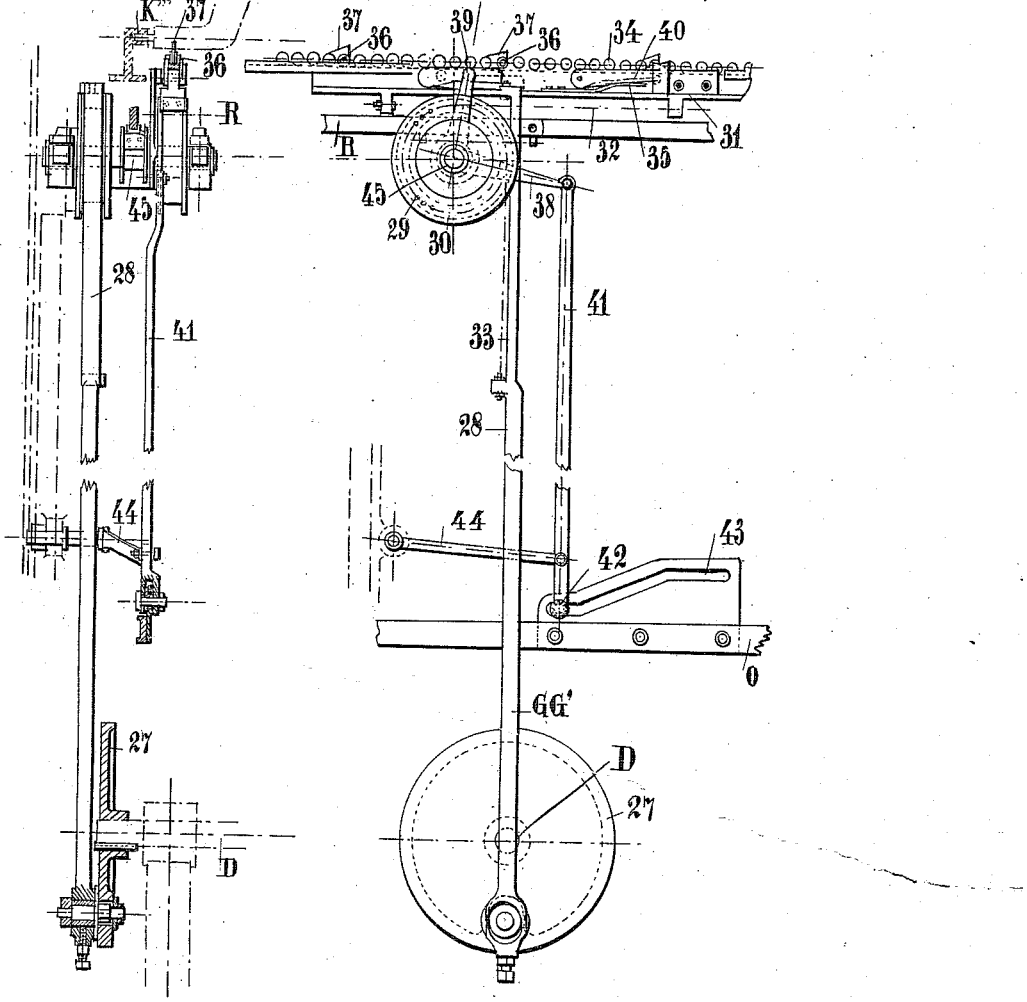

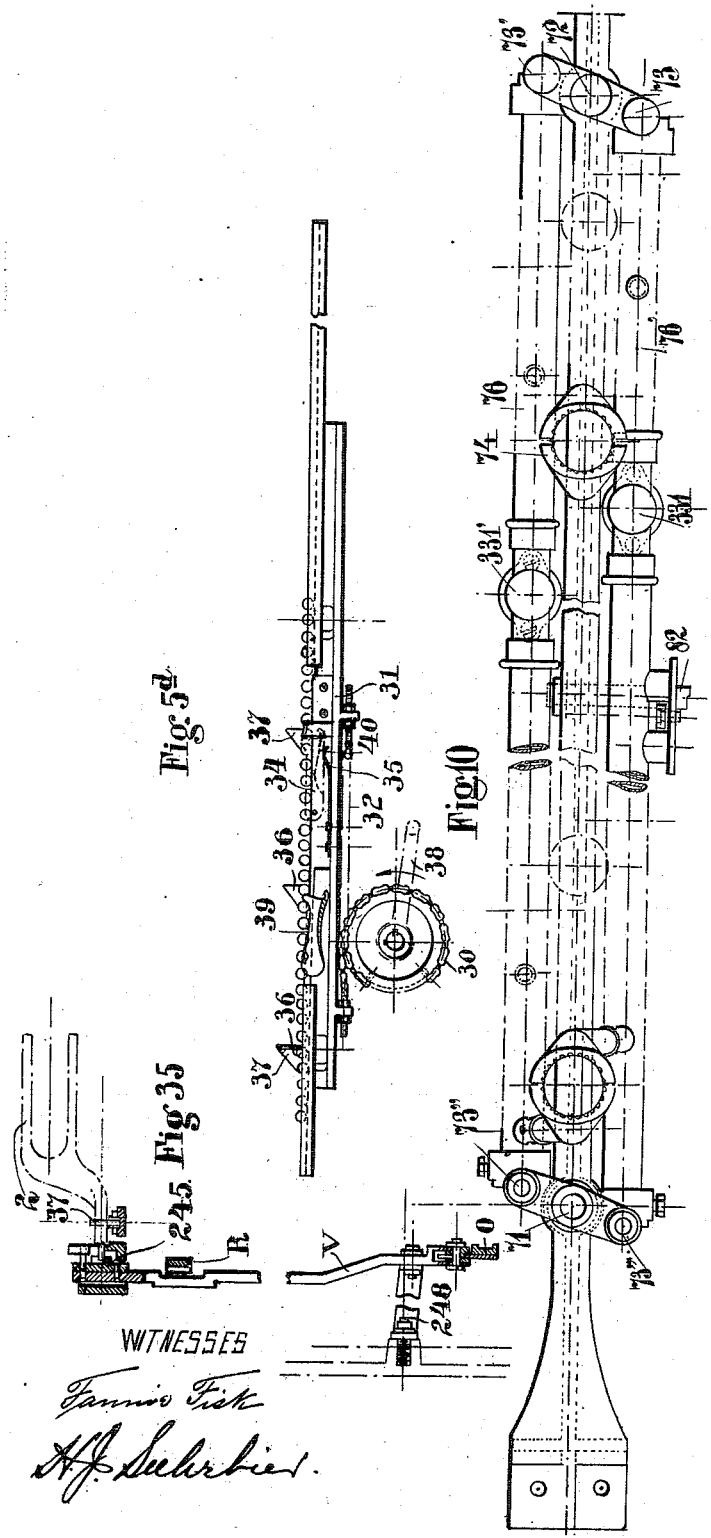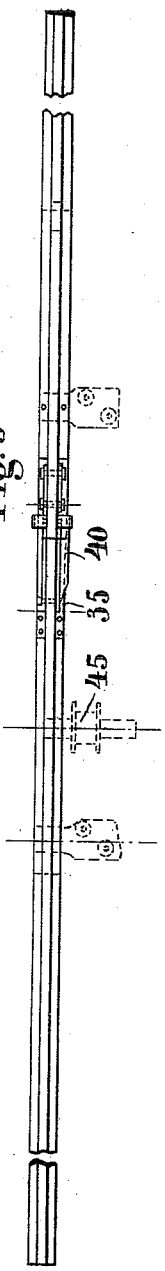

J. BONNET & J. L. MULLER.
MACHINE FOR CALCINING MANTLES.
APPLICATION FILED MAR. 16, 1909.

973,161.

Patented Oct. 18, 1910.
27 SHEETS—SHEET 11.

WITNESSES

INVENTORS
Joseph Bonnet
and Jean Leon Muller
BY
ATTORNEYS

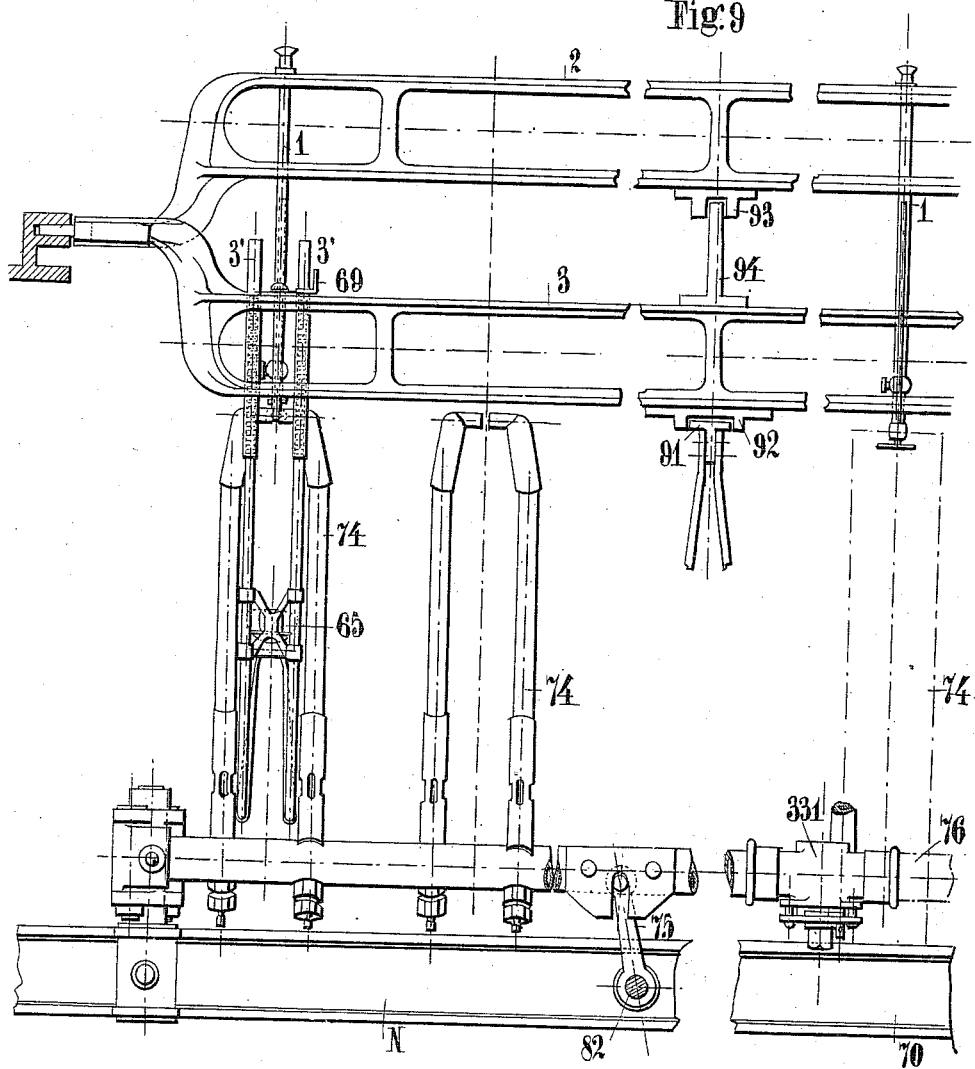

J. BONNET & J. L. MULLER.
MACHINE FOR CALCINING MANTLES
APPLICATION FILED MAR. 16, 1909.
973,161.
Patented Oct. 18, 1910.
27 SHEETS—SHEET 13.
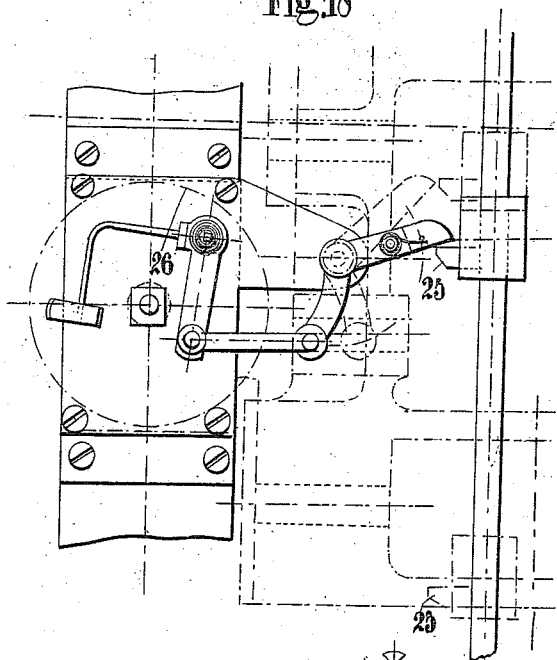
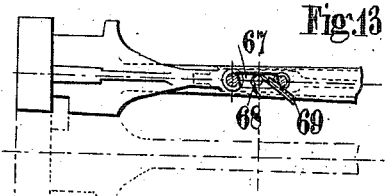
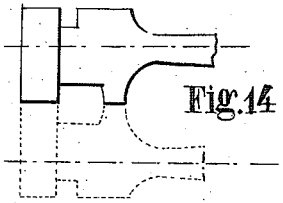
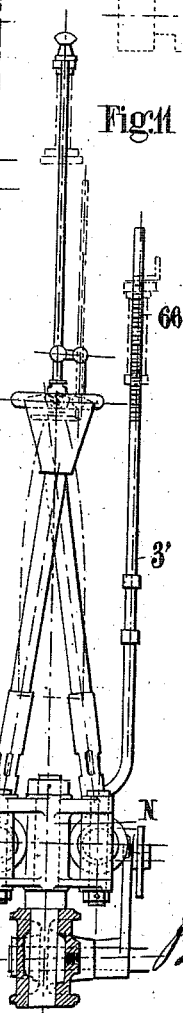
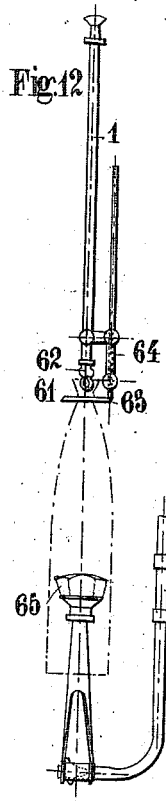
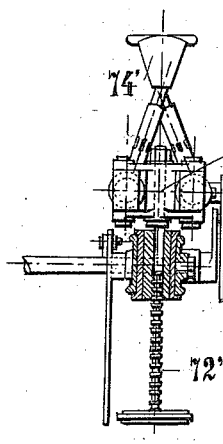
WITNESSES
INVENTORS
Joseph Bonnet
and Jean Leon Muller
BY
ATTORNEYS J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 14.
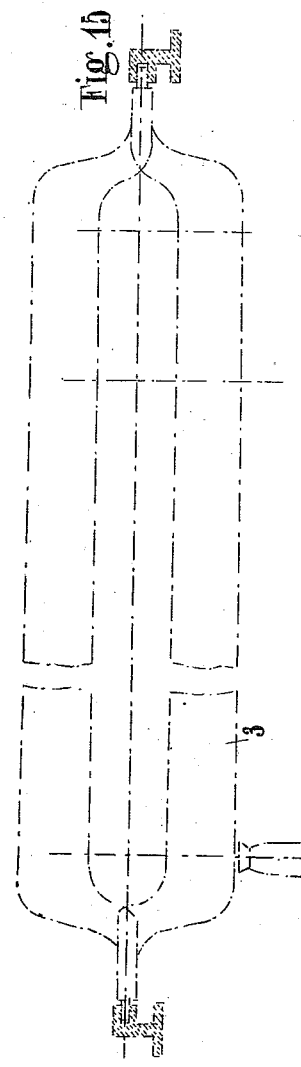
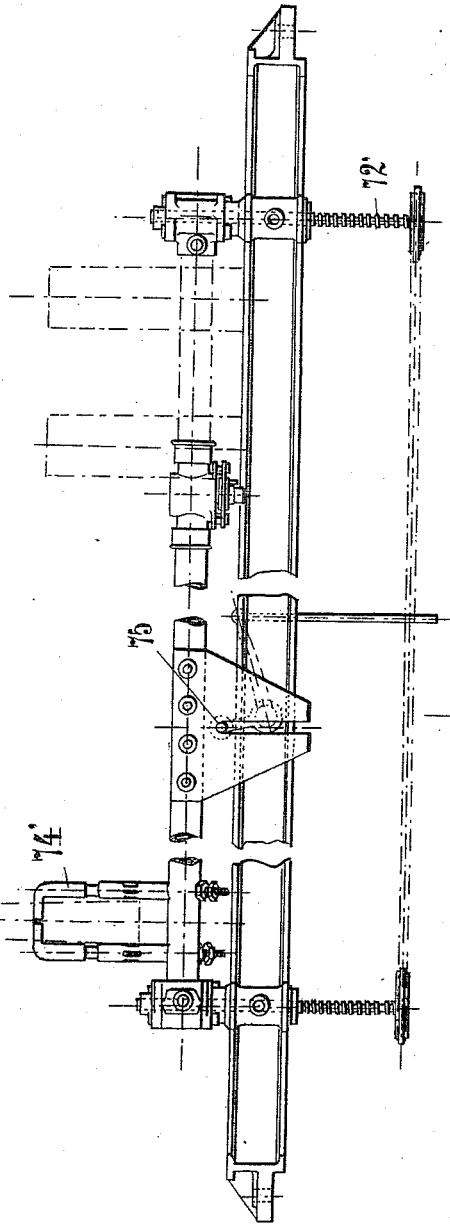
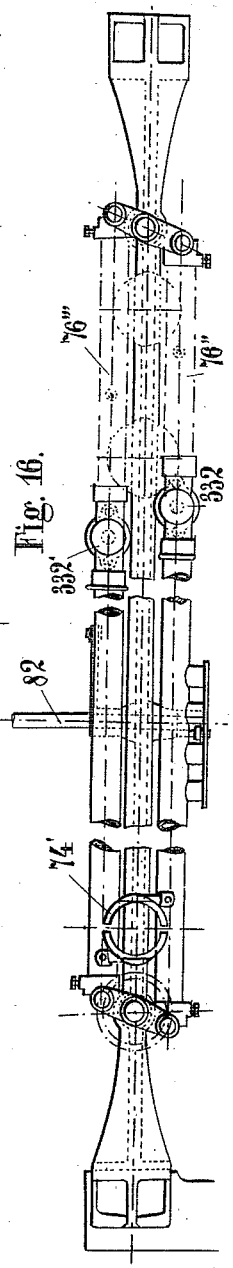

J. BONNET & J. L. MULLER.
MACHINE FOR CALCINING MANTLES.
APPLICATION FILED MAR. 16, 1909.

973,161.

Patented Oct. 18, 1910.
27 SHEETS—SHEET 15.

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 16.
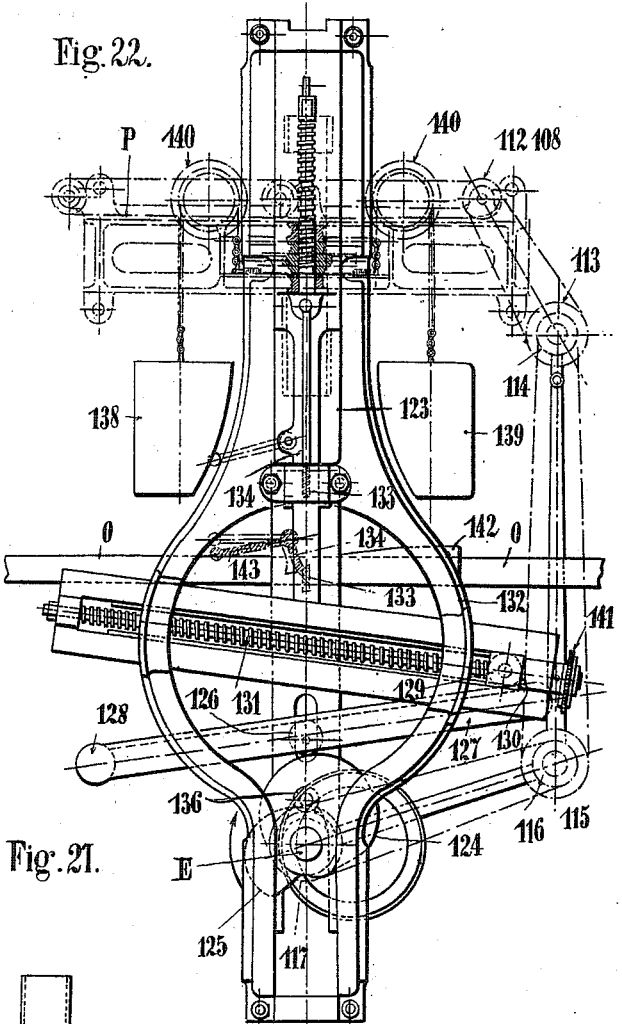
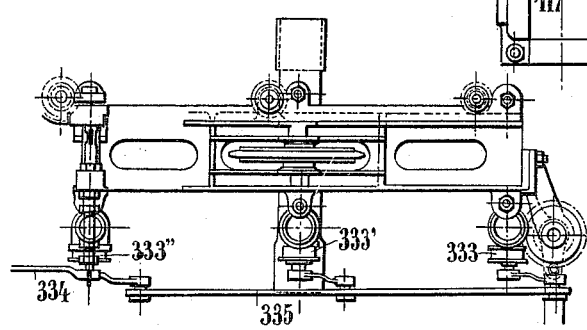
WITNESSES:
INVENTORS
Joseph Bonnet
and Jean Leon Muller
BY
Goepel & Goepel
ATTORNEYS.

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 17.
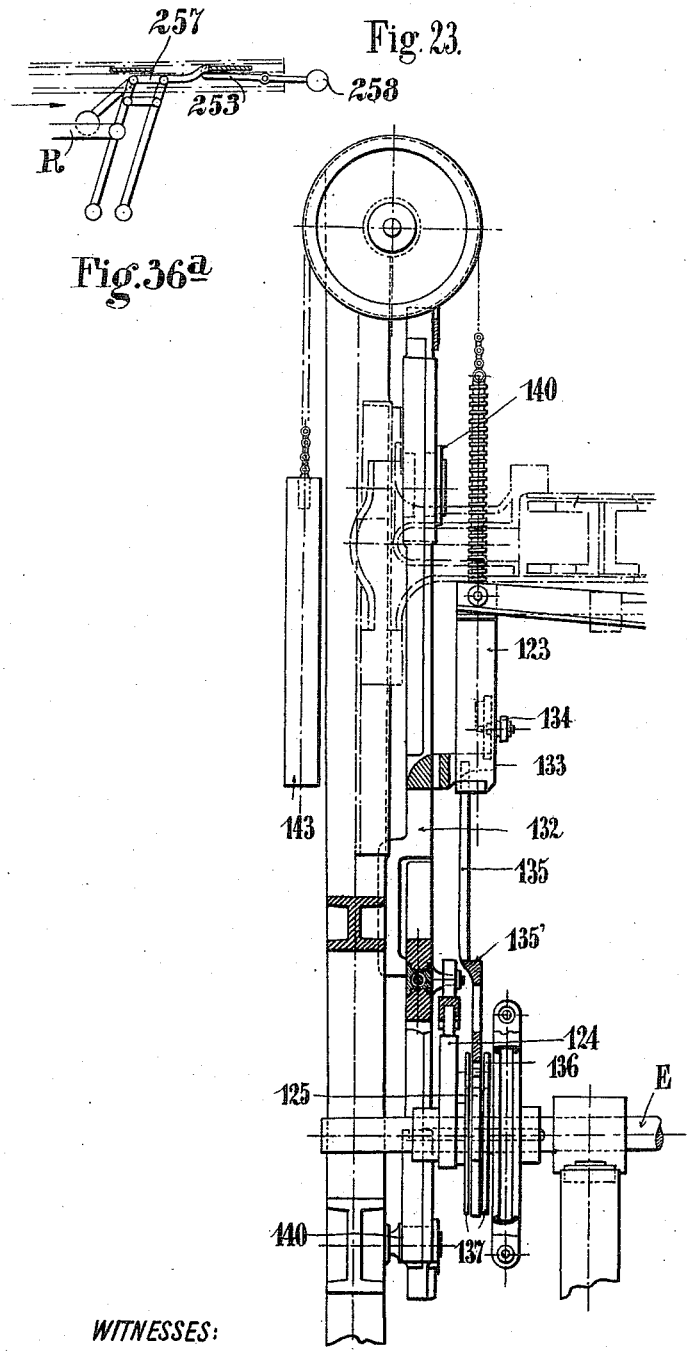
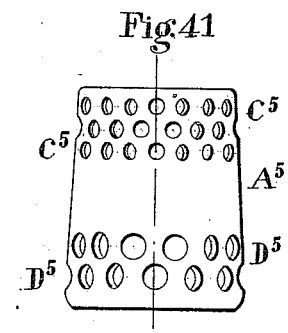
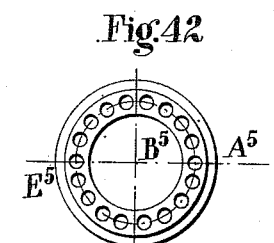
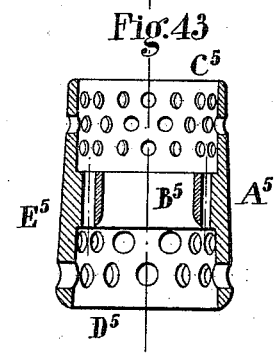
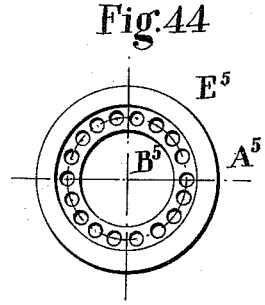

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 18.
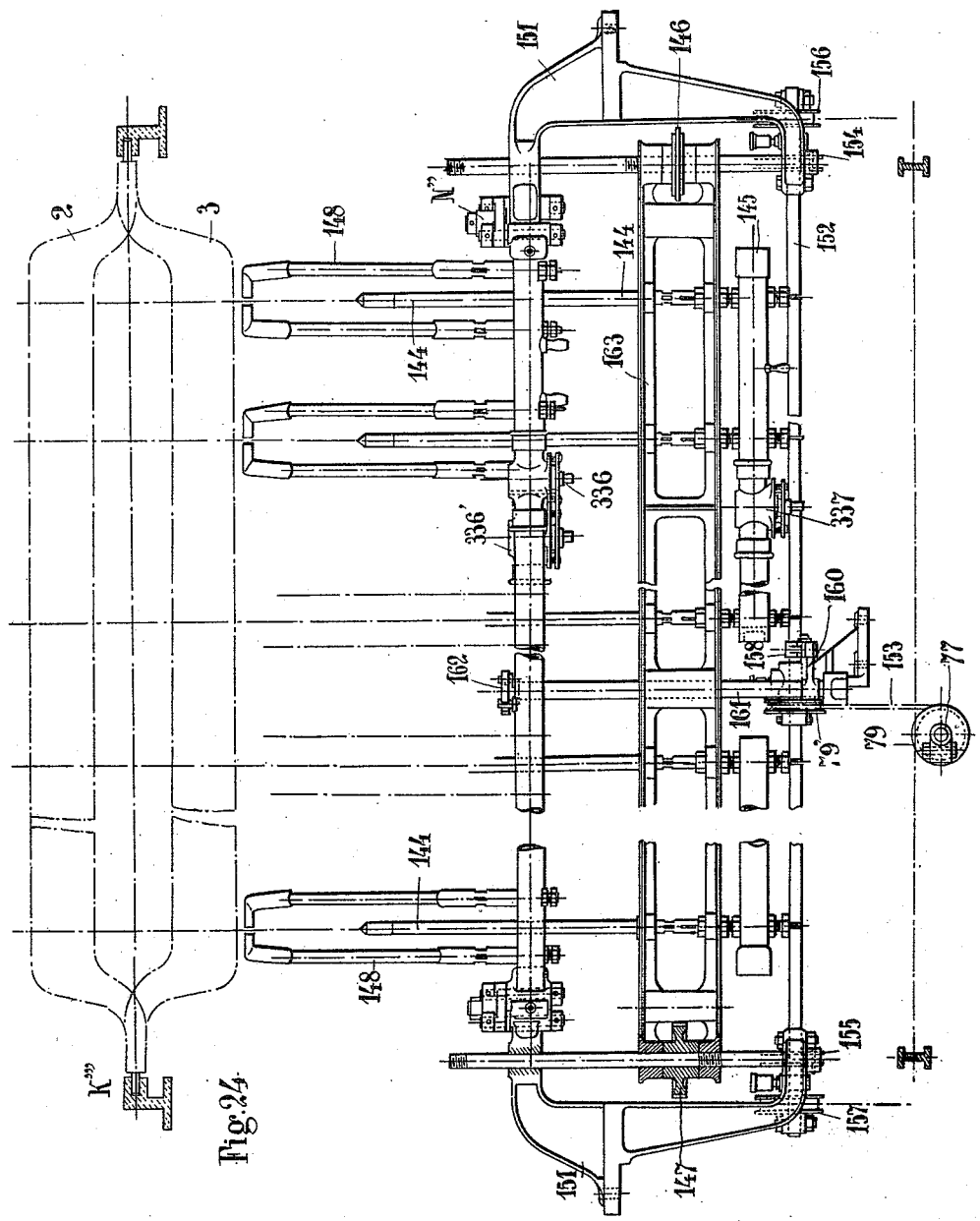
WITNESSES:
INVENTORS
ATTORNEYS.

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 19.
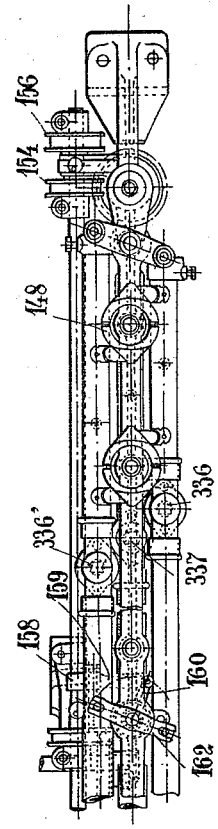
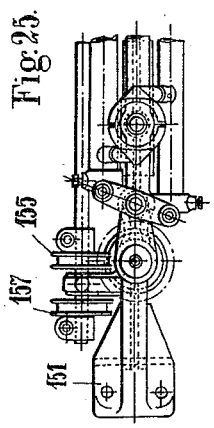
Fig. 23.
WITNESSES:
Fannie Fisk
H. J. Sulerbier
INVENTORS
Joseph Bonnet
and Jean Leon Muller
BY
ATTORNEYS.

J. BONNET & J. L. MULLER.
MACHINE FOR CALCINING MANTLES.
APPLICATION FILED MAR. 16, 1909.
973,161.
Patented Oct. 18, 1910
27 SHEETS—SHEET 21.
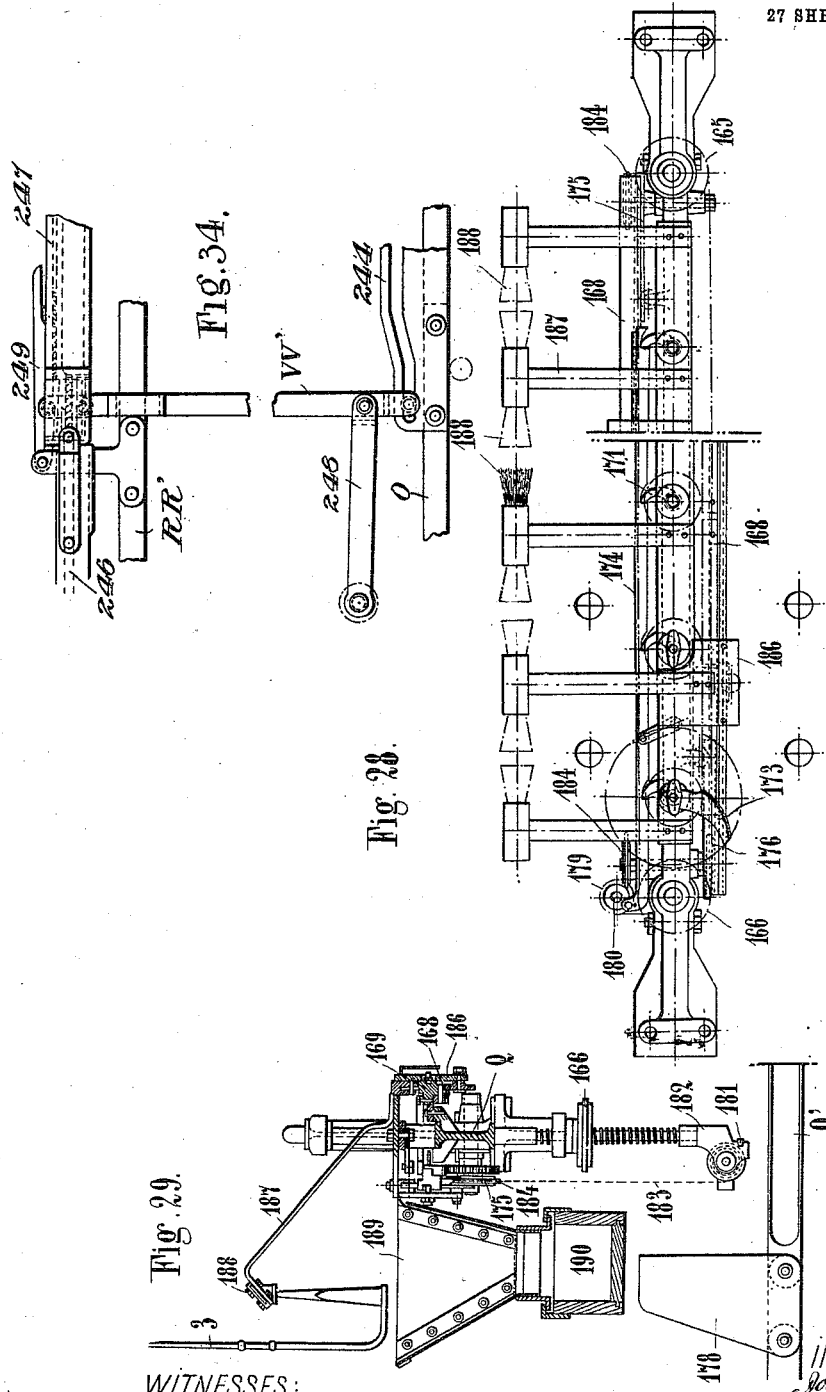
WITNESSES:
INVENTORS
Joseph Bonnet
and Jean Leon Muller
BY
ATTORNEYS.

J. BONNET & J. L. MULLER.
MACHINE FOR CALCINING MANTLES.
APPLICATION FILED MAR. 16, 1909.
973,161.
Patented Oct. 18, 1910.
27 SHEETS—SHEET 22.
Fig. 30.
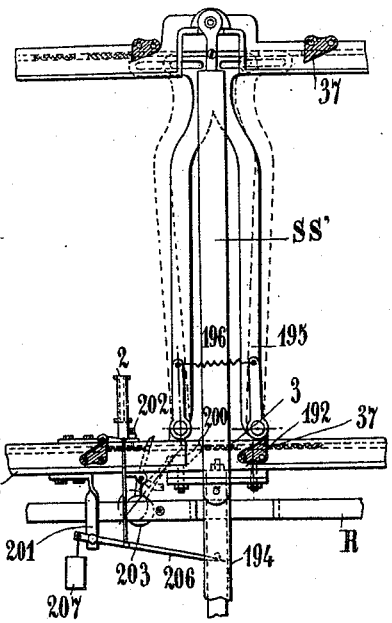
Fig. 31.
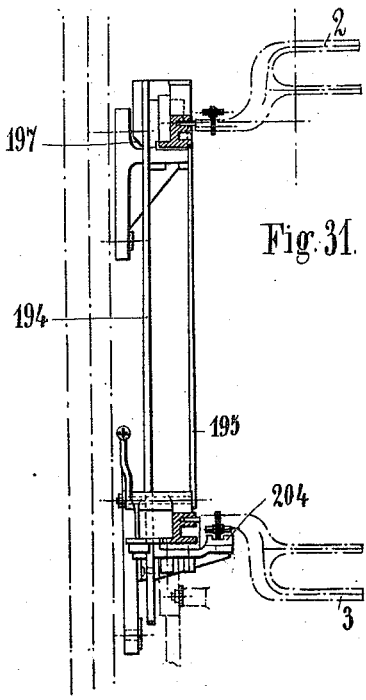
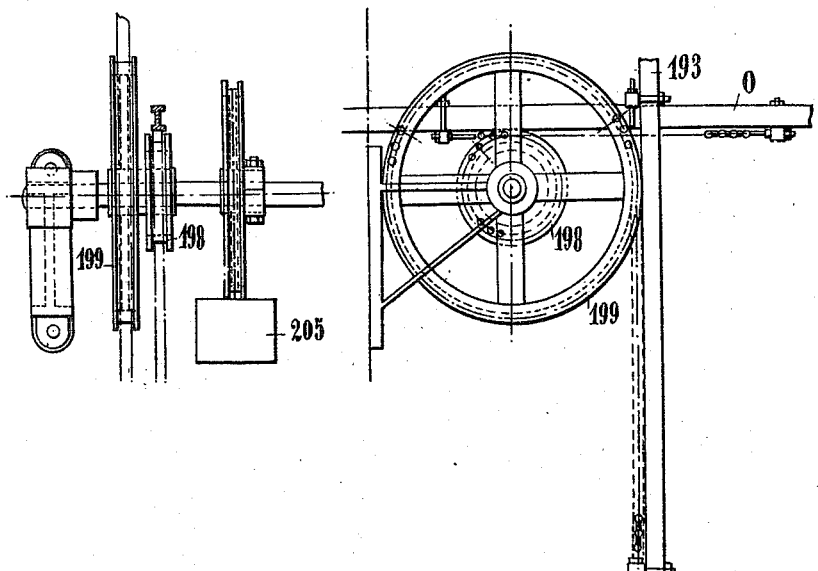
WITNESSES:
INVENTORS
ATTORNEYS.

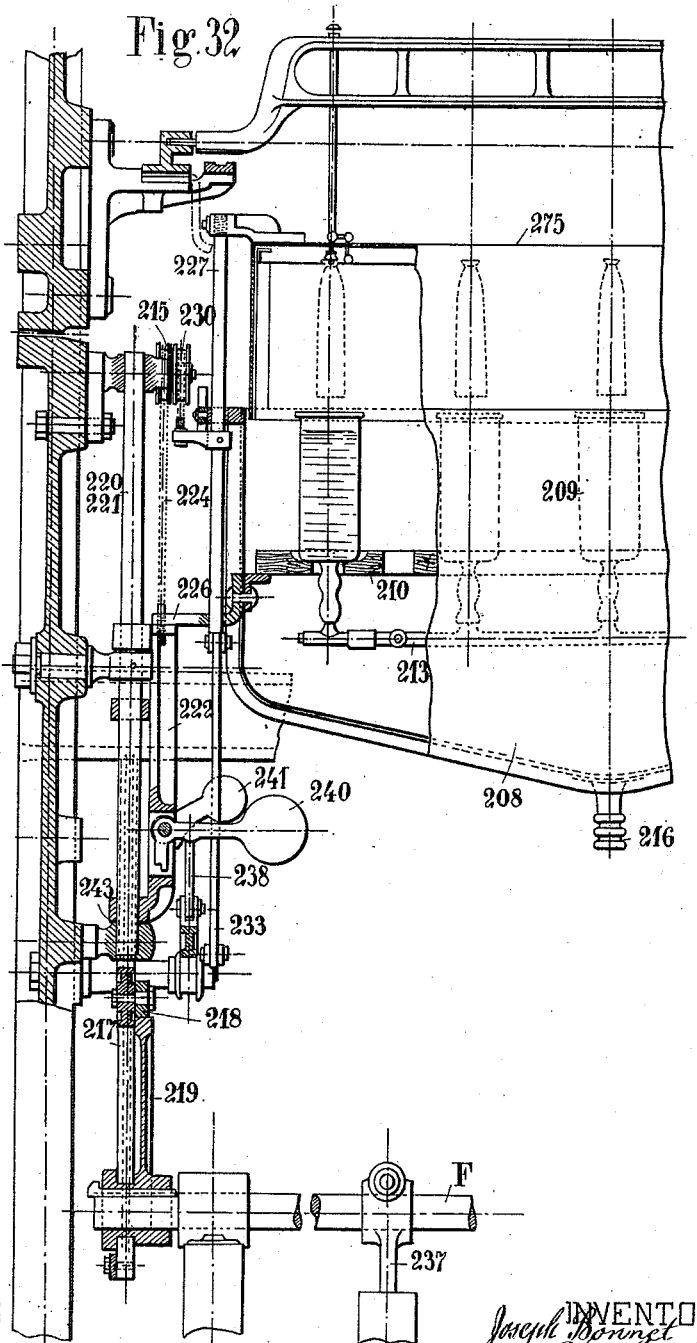

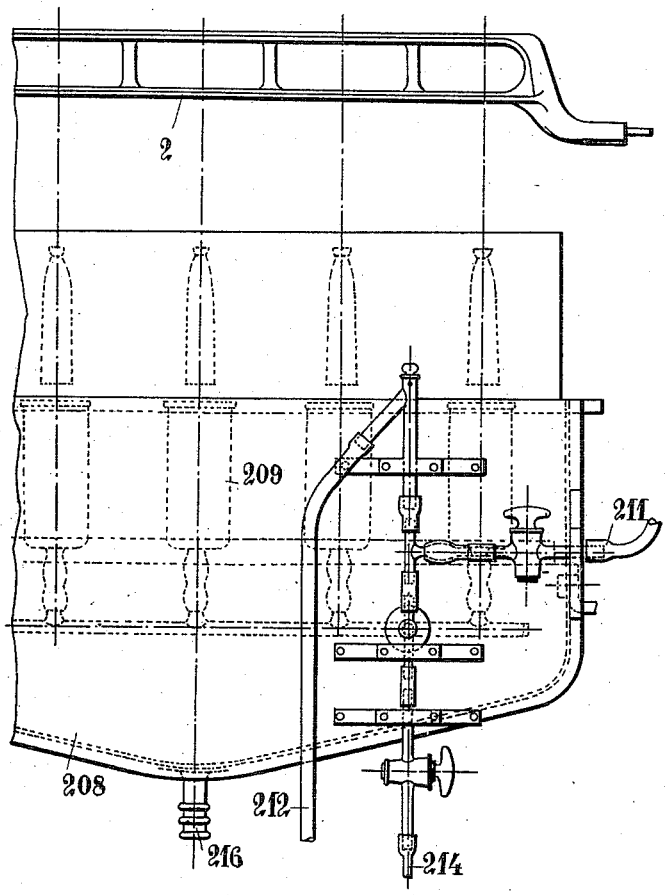

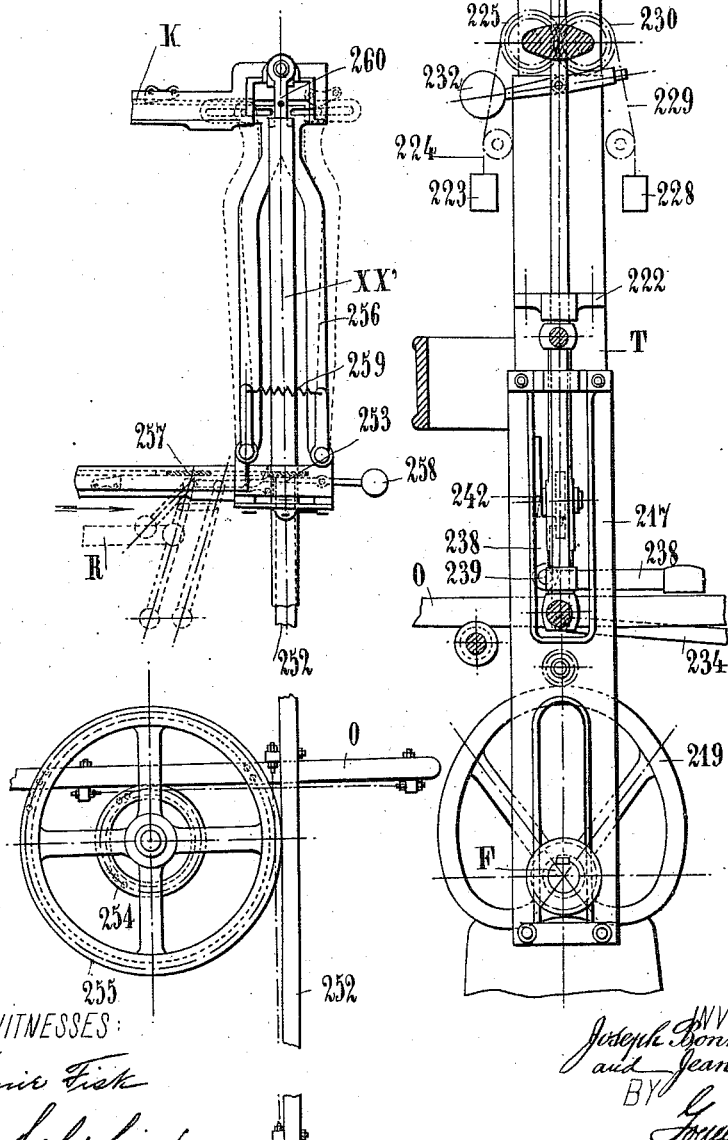

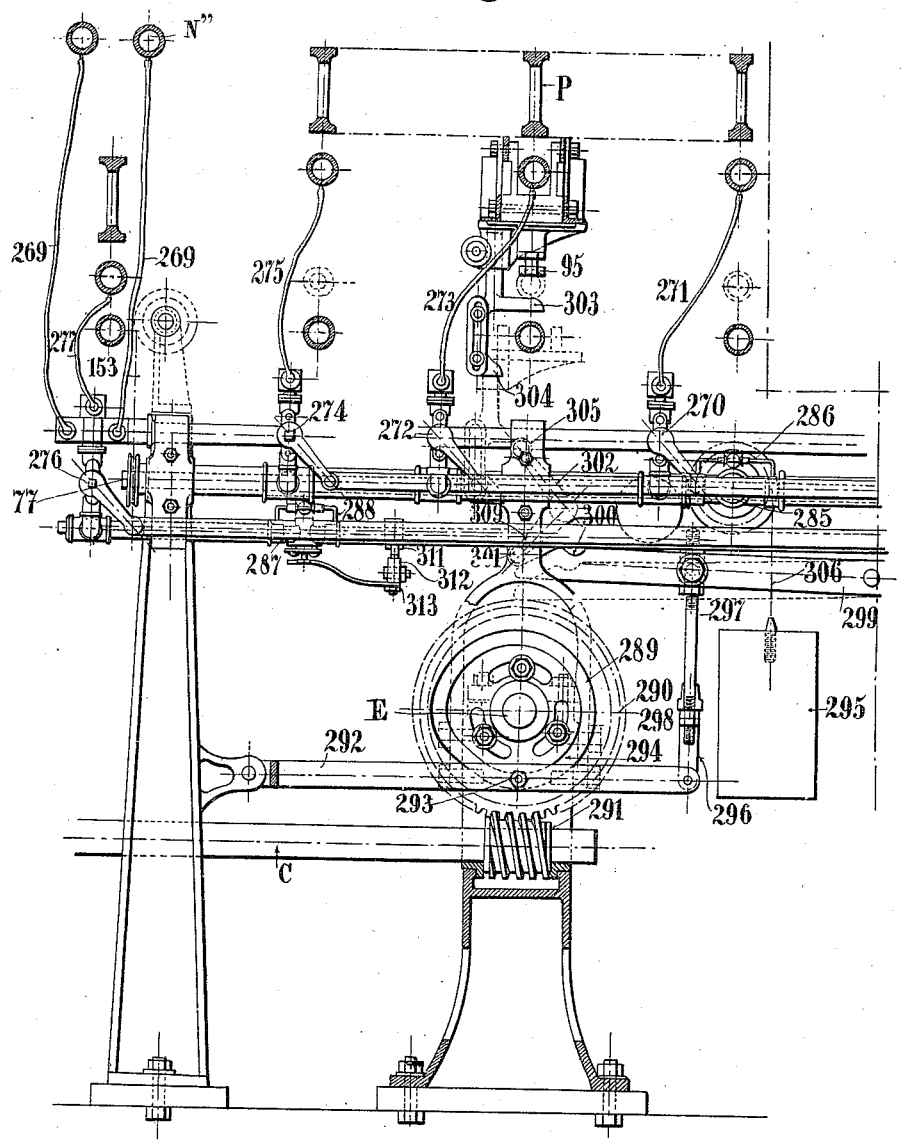

J. BONNET & J. L. MULLER.
MACHINE FOR CALCINING MANTLES.
APPLICATION FILED MAR. 16, 1909.

973,161.

Patented Oct. 18, 1910.

27 SHEETS—SHEET 27.

WITNESSES:

INVENTORS
Joseph Bonnet
and Jean Leon Muller
BY
ATTORNEYS.

UNITED STATES PATENT OFFICE.

JOSEPH BONNET, OF PARIS, AND JEAN LEON MULLER, OF SANNOIS, FRANCE.

MACHINE FOR CALCINING MANTLES.

973,161.

Specification of Letters Patent. Patented Oct. 18, 1910.

Application filed March 16, 1909. Serial No. 483,825.

*To all whom it may concern:*

Be it known that we, JOSEPH BONNET and JEAN LEON MULLER, citizens of the Republic of France, and resident, the first of Paris, the second of Sannois, France, have invented a new and useful Machine for Calcining Mantles, which machine is fully set forth in the following specification.

This invention relates to a machine for calcining mantles intended for gas lighting by incandescence, after they have been previously prepared and soaked in a solution of oxids of rare metals.

This machine mechanically effects the following operations: 1. Singeing at the upper portion of the mantle. 2. Singeing at the bottom portion of the mantle, in case the first singeing should be incomplete. 3. Incineration of mantles in three successive stages. 4. Calcining the mantle and burning the head of the mantle. 5. Cutting the mantle at a variable height. 6. Soaking the mantle in collodion. 7. Drying the mantles.

A construction of the machine according to this invention is illustrated by way of example in the accompanying drawings.

Figure 26:
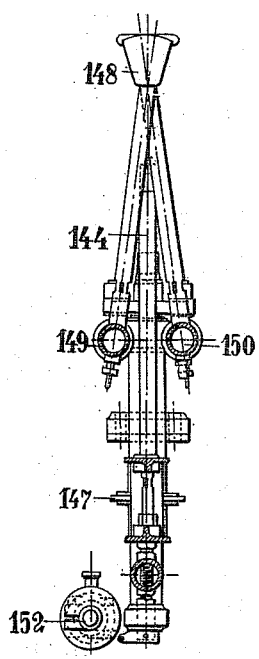
Figure 7:
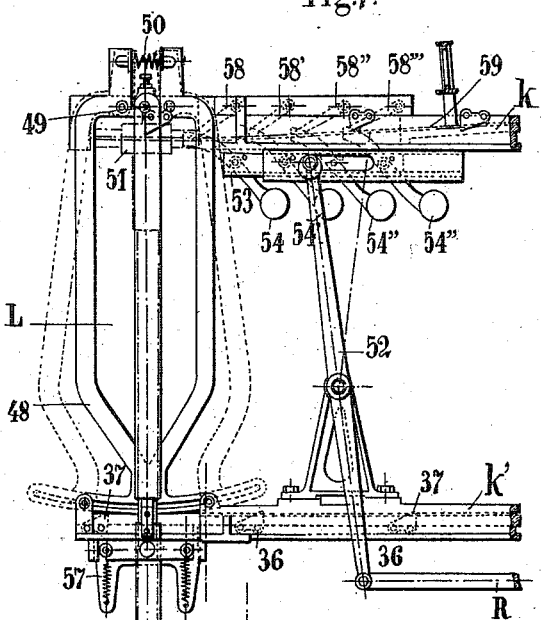
Figure 8:
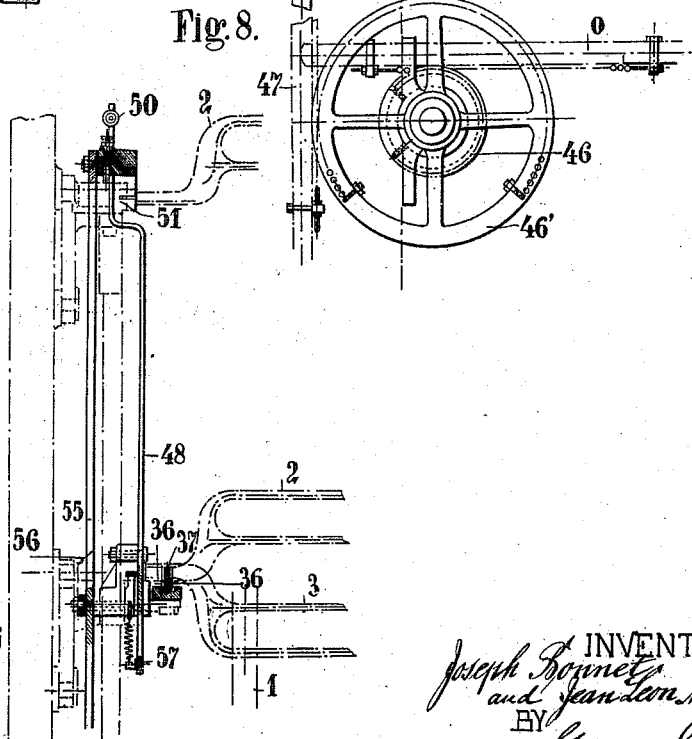
Figure 19:
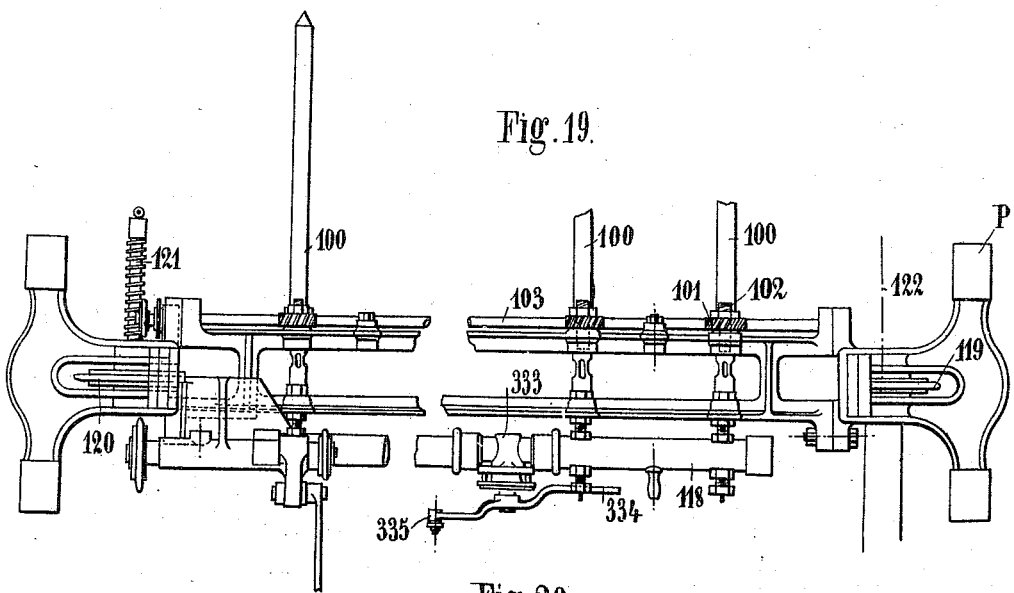
Figure 20:
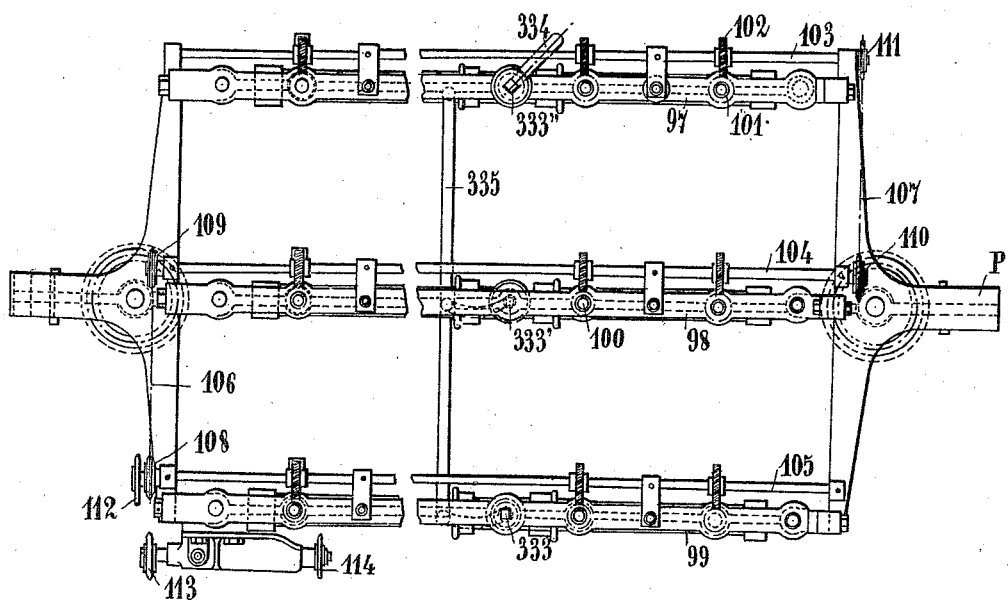
Figure 27:
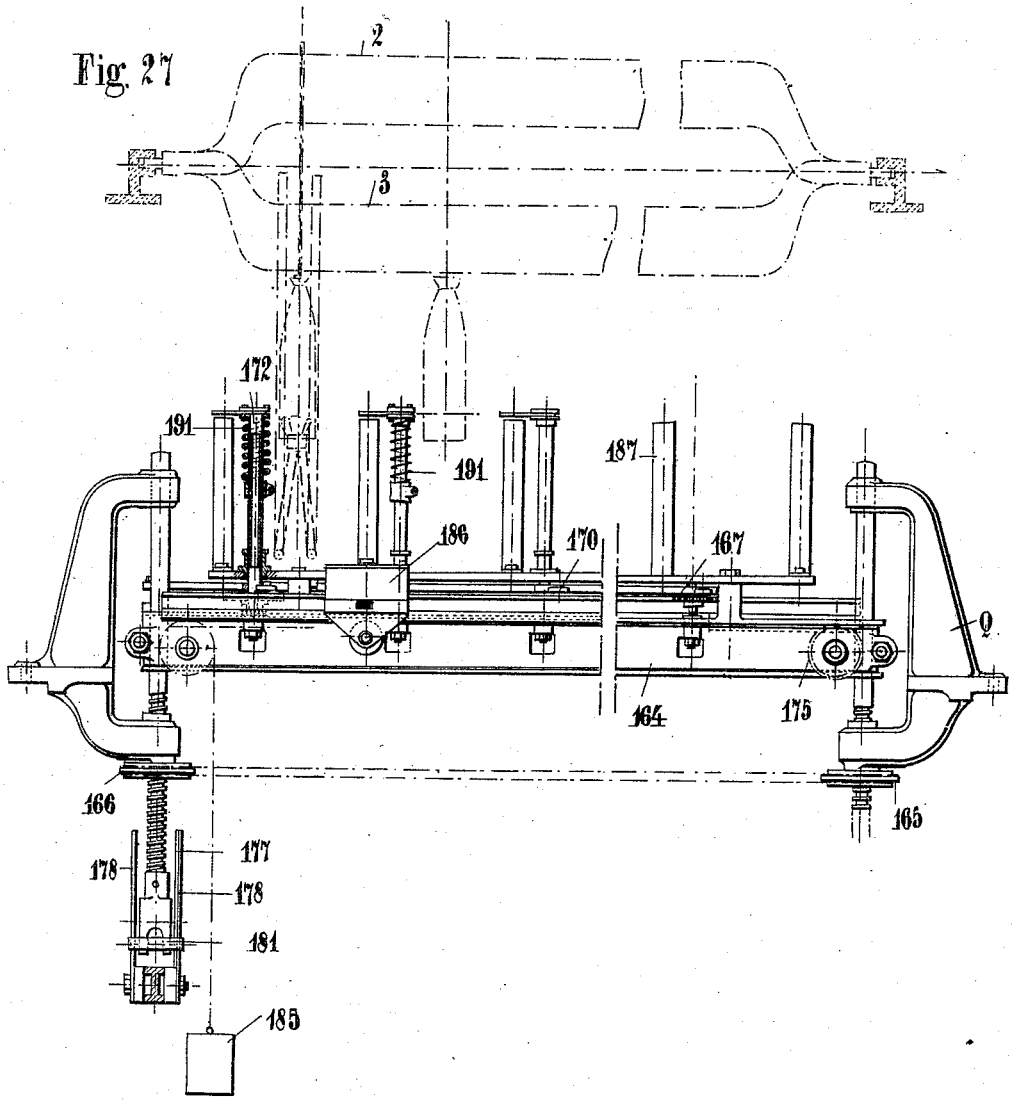
Figure 38:
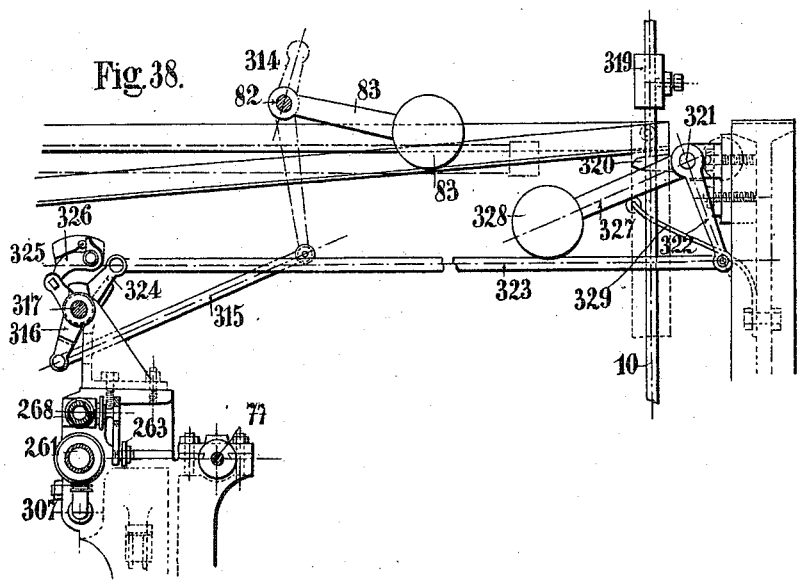
Figure 39:
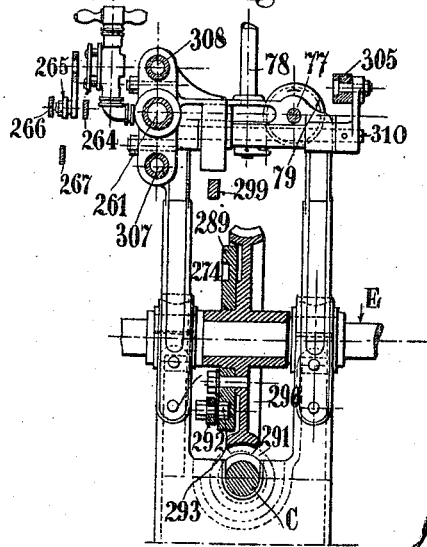

Figures 1, 1$^a$ and 1$^b$ form a side-elevation showing the whole of the apparatus; Fig. 2 is a front elevation; Fig. 3 is a plan showing on a smaller scale the position of the different parts of the apparatus. Figs. 4, 4$^d$ and 4$^e$ show on different scales an elevation of the device regulating the disengagement and the times of stopping (the so-called "time of stopping" device). Fig. 4$^a$ shows a transverse sectional view of the same. Fig. 5 is a side elevation of the motion for advancing the chain. Fig. 5$^d$ is an enlarged view of the same, Fig. 5$^f$ is an enlarged plan view of the same. Fig. 6 is an end elevation corresponding to Fig. 5. Fig. 7 is a side elevation of the front hoist or elevator. Fig. 8 is a cross-section corresponding to Fig. 7. Fig. 9 is a front elevation of the first singeing rack. Fig. 10 is a plan corresponding to Fig. 9. Fig. 11 is a side elevation corresponding to Fig. 9. Fig. 12 shows a detail of the mantle-holder and its guide. Fig. 13 is a detail of the adjustable guide showing the movement of the rods from the front and back in the bottom guides. Fig. 14 is a detail of the rods in the movement from the back forward, in the upper guides. Figs. 15, 16 and 17 are respectively elevation, plan and cross-section of the second singeing rack. Fig. 18 is an elevation showing details of the bell notifying the operator of the disengagement movements of the so-called "time of stopping" device. Figs. 19, 20 and 21 are respectively front elevation, plan and side elevation of the treble rack. Figs. 22 and 23 are respectively front and side elevations giving details of the mechanism of the treble rack. Figs. 24, 25 and 26 are respectively elevation, plan and side elevation of the calcining rack and of the head burners. Figs. 27, 28 and 29 are respectively elevation, plan and cross-section of the knife rack. Fig. 30 is an elevation of the central hoisting or elevating mechanism. Fig. 31 is a side elevation corresponding to Fig. 30. Figs. 32 and 32$^a$ are a front elevation of the collodion soaking rack. Fig. 33 is a side elevation corresponding to Fig. 32. Fig. 34 is an elevation of the mechanism for disengaging the projections secured to chain links. Fig. 35 is a cross-section corresponding to Fig. 34. Fig. 36 is an elevation of the mechanism for raising the rods at the back of the machine. Fig. 36$^a$ is a side elevation of a part of the same. Figs. 37 and 37$^a$ are a side elevation of the automatic valve gear for the gas. Fig. 38 is a front elevation of the same valve gear. Fig. 39 is another view partly in section of the automatic gas distributing apparatus. Figs. 40 and 40$^a$ show the positive control of the spindle controlling the opening of the racks. Figs. 41 to 44 relate to a part intended to hold the mantle during the singeing and calcining. Fig. 41 is an elevation, Fig. 42 is a plan, Fig. 43 is a vertical section, Fig. 44 is a bottom view.

Similar letters of reference indicate the same parts.

As will be seen on examining the diagram (Fig. 3) the general movement of the machine is produced by a driving gear A with adjustable speed, by means of which a movable roller in contact with a disk driven by the motor, transmits the motion to a pulley B keyed to a longitudinal spindle which in its turn transmits the movement to the transverse spindles D E F by means of worms.

The spindle E acting on the time of stopping mechanisms H and H', enables the driving chains for the rods supporting and guiding the mantles, to be advanced by means of the movement of rods G and G'. The latter drive the chains I and I' which travel (from the front backward for the bottom portions) over drums J and J', J" and J'" mounted loose on their spindles.

At each side of the machines, upper guides K and K", and bottom guides K' and K'" (Fig. 2) support and guide the rods holding the mantles.

On the chains being operated, the mantle supporting rods are first driven by means of bars R and R' with pawls (Figs. 1 and 1ª) in the upper guides from the back forward toward the front hoists or elevators L L' which lower them to the bottom guides K' and K'" (Fig. 2). The rods are moved then from the front to the back of the machine, but stop soon at the first hooking position M (Fig. 1) where the mantles are suspended to hooks 1 secured to rods 2 (Figs. 1 and 2). From the hooking position M (Fig. 1) the mantles, again driven by the chains, are brought to the first singeing rack N where a stoppage takes place due to the automatic devices, called the "time of stopping" devices, H and H', which, by acting on the cam bars O and O', interrupt the driving movement of the rods G and G'.

The first singeing having been effected, the so-called "time of stopping" devices H and H', still by means of the cam bars O and O', enable the rods G and G' to bring about a new movement of the chain, which brings the mantles into the positions M' and M", and thence to the second singeing rack N'. The different movements of the stopping time mechanisms H and H' and of the rods G and G' being repeated, bring the mantles above the treble rack P, the rise, descent and fall of which is brought about by the spindle E. From the treble rack P, owing to the same succession of movements, the mantles arrive above the calcining and head burning racks N". Thence they are brought above the knife rack Q where the mantles are cut to various heights.

On leaving the knife rack, it becomes necessary to separate the guide rods 3 from the pawl supporting rods 2. To that end the pawl bars R R' separate the rods 3 from the rods 2, and bring the rods 3 into engagement with the hoists S and S', which raise them into the upper guides K and K" where they are again driven forward. During that time the mantle-holding rods 2 continue their movement backward, passing through the cooling stations M'" and M⁴ in order to arrive above the collodion dipping rack T.

Under the action of the spindle F, the dipping is effected by the raising of the collodion box. On coming out from the vessels containing the collodion, the mantles are allowed to rest for a moment, owing to the action of the stopping time mechanisms H and H', still by means of the cam bars O and O'.

On leaving the collodion rack T, the mantles pass into a drying chamber U where the rising movement takes place, for disengaging the rods 2 from the driving chains I and I', by means of the hoists V and V' operated by the cam bars O and O'. At that moment the rods are pushed into the bottom guides K' and K'" by means of the pawl bars R and R'. In the drying chamber U the rods 2 are pushed against each other as far as the outlet where the pawl bars R and R' bring them into engagement with the back hoists X and X' which raise them again into the upper guides K and K" where they are again driven forward. A conduit Y is provided for the suction of ether vapors by means of a fan Z. This conduit is fixed to the fan Z by one of its ends, and at the other end is divided into two parts which are fixed to the nozzles 216 shown in Fig. 32.

From the foregoing description, it will be seen that the mantle supporting and guiding rods 2 and 3 are pushed into the front hoists or elevators L and L', the central elevators S and S' and the back elevators X and X' at one and the same moment by the pawl bars R and R', and that the said various hoists or elevators act simultaneously on the rods supporting and guiding the mantles for bringing them into their respective guides by means of the cam bars O and O'.

*Mechanism for the time motions.*—At the beginning of the present description it was stated that the central spindle C rotated the spindle E on which were mounted the time mechanisms H and H'. These movements are intended to enable each mantle supporting rod to stop above the various burners the time required for each operation. By their means it is also possible to regulate the waiting periods of the mantles before they are dipped into the collodion, this being done for the purpose of enabling the rods to get cool.

The time mechanisms which are similar to each other, each comprise an eccentric 4 (Fig. 4) keyed to the spindle E. The said eccentric carries a lever arm 5 operating by means of its end a balance beam 6 capable of assuming the position 6' shown dotted. The balance beam 6 moves therefore, in a direction longitudinal to the machine, keeping in its bifurcated end the cam bar O, the example shown being that for the right hand side of the machine. In this movement, the cam bar O is not driven, the fork at the end of the balance beam 6 acting merely as a guide for the cam bar O. On the balance beam 6 there is arranged at 7 a tenon which, at each movement of the balance beam 6, strikes against a tappet 8 which raises the pawl 9 pivoted at the end of an arm of the tappet 8 and engaging with the teeth of the tooth rack 10. The tappet 8 is supported by an arm serving at the same time as a spindle for the pawl 11 and fixed to the piece A which carries the tenon 24. This piece 24 is itself mounted on the frame of the machine (see Figs. 4ª, 4ᵇ, 4ᵈ, and 4ᵉ). At each rise of the tooth rack 10, the pawl 11 engages with the teeth of the tooth rack in order to prevent it from falling back.

The number of teeth of the tooth rack 10 is calculated in such manner that the complete rise corresponds to the period of time required for the different stations of the mantle carrying rods. The tooth rack 10 is moreover, regulated by means of a buffer 12 which, according to the level at which it is secured, can increase or reduce the time of waiting at each station. The buffer 12 is adapted to receive the lower end of the rack 10 at the moment it is set free and falls thereinto without being retarded in its fall by any friction device. Fig. 4ª shows the mounting and adjusting means for the buffer 12.

The tooth rack 10 is provided at 13 (Figs. 4ª, 4ᵈ, 4ᵉ) with a stop which, on striking the tenon 14 of the part 15 pivoted to the cam-bar O as shown in the dotted lines of Fig. 4ᵉ, forces the latter back and releases the part 16 also pivoted to the bar O and formed with two parallel jaws and which being no longer held, falls on the head of the balance beam 6 and engages by means of a recess or notch 17, with a cross-bar 18 connecting the two sides of the fork of the balance beam 6. From that moment, the cam bar O being connected to the balance beam 6, participates in its movement. The rack 10 is more distant from the center-plane of the machine than the cam-bar O.

A cam 19 secured to the cam bar O in the advance movement of the latter, is intended to meet a tenon 20 secured to the pawl 11, and by moving away the latter, to release the tooth rack 10. The part 15 is also provided with a projection 21 intended to engage with the notch 22 of the part 16 when the point 23 strikes a fixed tenon at 24 on the return movement.

*Operation of the time mechanisms.*—The eccentric 4 (Fig. 4) rotating with the spindle E, drives the balance beam 6 by means of the arm 5. At each return of the balance beam backward, the tenon 7 strikes the tappet 8 which raises the pawl 9 engaging with the tooth rack 10, to the extent of one tooth. The spring pressed pawl 9 is then drawn downwardly and engages another tooth of the rack 10 which, in the meantime is held by the pawl 11. This reciprocatory movement of the pawl 9 continues until on the tooth rack arriving at the top end of its travel, the stop 13 moves the part 15 to the position of Fig. 4ᵉ by striking against the tenon 14. The shock forces the end 21 of the part 15 to come out from the recess 22 of the part 16, and bring about the fall of the latter on the head of the balance beam 6. The part 16 engaging by means of its recess 17 with the cross-bar 18 of the head of the balance beam, the latter, in its movement of advance toward the front of the machine, drives, therefore, the parts 16 and 15 secured to the cam bar O. When the cam bar O returns backward, the part 15 striking the tenon 24 fixed to the piece A (Fig. 4ª), forces the point 21 to raise the part 16, in order to engage again with the recess 22. In the same movement, the part 16 disengages the head of the balance beam 6 which continues to push the cam bar by its contact with two cheeks 16' arranged at the sides of the part 16, and to insure in that way the bringing of the elevators L L', S S' and X X' into the proper position.

In the forward movement of the cam bar O, the cam 19 strikes the tenon 20 and disengages the tooth rack 10 which falls back again into the dashpot 12. In its upward movement, the tooth rack 10, by means of a stop 25, operates a bell 26 (Fig. 18) the object of which is to notify that the movement of the cam bar has taken place.

*Mechanism for advancing the chains and the mantle supporting and guiding rods.*— The devices for advancing the chains, which are similar on both sides of the machine, will be described only for the right hand side. This mechanism comprises an eccentric 27 (Figs. 5 and 6) secured to the spindle D (Fig. 3).

The eccentric 27 imparts a reciprocating motion to a rod 28 to which is secured a chain 33 which is wound on a drum 29. A second drum 30 secured to the same spindle as the first, and participating in the same movement as the latter, is connected to a chain "bridge" 31 by means of a chain 32.

To the chain bridge 31 supported as shown in Figs. 5ᵈ and 5ᶠ is secured a pawl 34 which consequently makes the same reciprocating movement as the bridge 31. The said pawl 34 under the influence of the action of a spring 35, always has the tendency to rise and to engage with one of the tenons 36 projecting at each side of the links 37 provided with stops. The bridge 31 is placed above a groove in the track in such a manner that the chain becomes apparent. The bridge moves and slides in the track under the action of the chain 32.

On the same spindle as the drums 29 and 30 is loosely mounted a right angle part 38 carrying at its upper portion a roller 39 intended to engage with a track 40 provided on the pawl 34. The right angle part 38 is connected to a rod 41 which slides at its bottom portion by means of a roller 42 in a cam groove 43 secured to the cam bar O. An arm 44 connects the rod 41 to the upright of the machine for insuring its rigidity. The drum 45 is mounted on the same spindle as are the drums 29 and 30 and it is adapted to move the pawl bar R.

*Working of the mechanism for advancing the chains and the mantle supporting rods.*—It will thus be understood that, when the balance beam 6 (Fig. 4) pushes the cam bar O toward the front of the machine, the roller 42 sliding in the groove of the cam 43, causes the rod 41 to rise.

The bottom arm of the angle part 38 being raised, the upper arm is moved toward the back of the pawl 34 so that the latter can be raised by the spring 35. The end of the pawl 34 engages then with the tenon 36 of the link of the chain I. At that moment, the rod or bow 28 which is continuously driven with a reciprocating motion, drives in its turn the chain bridge 31, but this time with the chain I which controls the rods carrying the mantles. In its return movement backward, the pawl 34 meets the roller 39 which has resumed its original position, because at that moment the stopping time mechanism H has brought back the cam 43 and lowered the rod 41. The roller 39 engages with the track 40 on the pawl, and again lowers the latter (see Fig. 5).

The links carrying the stops 37, push the rods carrying the mantles by means of the said stops or projections, into the guides K K' K'' K'''.

It goes without saying that the device for advancing the chain is in duplicate, so as to obtain synchronous advance of the ends of the mantle supporting rods.

The movement of the rod or bow 28 comprises also the control of the pawl bar R by means of a drum 45 driven at the same time as the drums 29 and 30.

*Mechanism of the front elevators or hoists.* (Figs. 7 and 8).—The front elevator L, similar in every way to the other front elevator L' and operated by the cam bar O by means of the drum 46, raises and lowers the rod 47 by means of a second drum 46'. On the drums 46 and 46' are wound chains connected to the cam bar on one side, and on the other side to the rod stem 47 of the elevator. The shutters 48 extend from the upper guide to the lower guide. At their lower part they are curved inwardly until they meet and are provided with grooves receiving fingers fixed to the lower guide. They being pivoted to a spindle 49 carried by the upper tracks, can be opened, as shown by the dotted lines of Fig. 7, under the action of the sliding of the mantle supporting rods at the moment of their descent from the upper to the lower guide. These shutters are closed again by the action of a spring 50. The rod 47 is provided at the top with a head 51 intended to receive the ends of the rods carrying the mantles and guides.

The pawl bar R is connected at the front end to a balance beam 52 operating a carriage or slide 53 which carries in its longitudinal direction four pawls 54, 54', 54'', 54''' intended to push the mantle supporting rods in the groove of the upper guide K.

The rod 47 of the elevator L is guided by a bar 55 fixed by bolts upon the pieces terminating the extremities of the upper and lower tracks which is provided at 56 (Fig. 8) with a notch forming a cam intended to engage and push back a carriage introduced into the head 51 of the hoist, and by that movement, to disengage the mantle supporting rods which at that moment are held between the closing shutters 48 and a movable plate 57 on the level with the bottom guide K'. This carriage is adapted to maintain the ends of the supporting rods, and to seize and abandon the latter at the proper time. It consists of two jaws which, on approaching, seize the supporting rods, and turning aside, release them. This last movement takes place under the action of the cam 56 which causes the jaws to recede and turn aside at the same time.

Pawls 58, 58', 58'', 58''' have for their object to moderate the advance of the mantle supporting rods and at the same time to prevent them from returning back.

*Working of the mechanism of the front elevators.*—The movement of the mantle supporting rods in the front elevator L takes place in the following manner:—On the stopping time mechanism H becoming operative, the cam bar O starts as already described, and the mechanism of the rod or bow G operates the chain I which, on moving, brings the rods carrying the mantles and guide supports to the inclined guide 59. On the other hand, the pawl bar R being continuously operated in the horizontal direction by the mechanism of the rod or bow G, transmits, by means of the balance beam 52, a reciprocating movement to the slide 53 carrying the pawls 54, 54', 54'', 54'''. On the rods arriving near the end of the pawls in question, they are seized by the latter and pushed toward the head 51 of the elevator. In that movement, each mantle supporting rod is driven separately, that is to say, the rod 2 carrying the mantle arrives first at the head 51 and the rod 3 carrying the guide is brought into it in its turn after several movements forward of the slide 53. The descent of the slide 59 and the introduction of the rods into the head 51, take place slowly and in several stages, so as to avoid shocks. Tappets 58, 58', 58'', 58''' are mounted upon spindles and press against the mantle carrying rods, so as to prevent any backward movement or too rapid a forward movement of said rods.

On the two rods having been properly introduced into the head 51, a new movement of the stopping time mechanism H brings about the movement of the cam bar O, which by means of the drums 46 and 46', lowers the rod 47 along the bar 55. The head 51 secured to the rod 47, is thus lowered and brought to the level of the bottom guide K'. In that movement of descent the lugs of the rods 2 and 3, held on the right and left hand side by the shutter 48 against which they rest at its bottom portion, force it to open (as shown dotted in Fig. 7). At the same time, a carriage or slide arranged in the interior of the head 51 coming into contact with the inclined plane arranged on the bar 55, is given a return movement which results in the release of the lugs of the rods which at that moment are engaged between the bottom portion of the shutter 48 and the top of a movable plate 57. The movement forward of the chain I taking place, it drives the two rods into the position M. The mantles previously arranged on mandrels 60 (Fig. 1) are hooked to pins 1 secured to rods 2. Figs. 9, 11 and 12 show specially this method of hooking.

A pin 1 supported by the rod 2, is provided at its bottom portion with a hook 61 for a mantle, the head of which is provided with a transverse asbestos thread. The mantle having been hooked, a part 62 presses on it for preventing it from rising.

In the special case in which the head of the mantle is provided with a metal ring 63, the said ring is provided with a part extending vertically and introduced into a part 64 to which it is secured.

With its bottom portion the mantle engages with a part 65 recessed in the interior and supported by guide rods 3' secured to the rods 3, said part 65 serving to prevent deformation of the mantle.

The rods 2 and 3 are arranged for supporting ten mantle holding rods as well as ten guide rods, but this number is given of course merely by way of example. A special device shown in Fig. 13, enables the guide rods to be raised or lowered, to accommodate mantles of different sizes. This result is obtained by means of a rack upon the rods 3¹, and the piece 67 which engages between the teeth of the rack (Figs. 9 and 13). These rods are provided at their upper end with grooves 66 with which engages a plate 67 held by a spring 68. By operating a driver 69 it is, therefore, possible to disengage the plate 67 from the grooves 66 and to release the rods 3.

The rods 2 having been provided with mantles in the position M, a new movement of the chain I carries them above the singeing rack N (Figs. 9, 10 and 11). The said rack is intended to do the singeing at the upper portion of the mantles.

*Mechanism of the first singeing rack.*— The rack N (Figs. 8 and 10) comprises a transverse bar 70 secured to the frame with its ends and carrying two pins 71 and 72 on which are pivoted two pieces on which are carried two gas pipes 76 76' pivoted at 73, 73', 73'', 73'''. To the said conductors or pipes are secured the burners 74. Under the action of a lever 75, the pipes 76 and 76' are moved parallel to each other and by that movement, move apart the burners 74. The said burners are divided into two parts secured respectively to the two pipes 76 and 76'. The movement apart of the said two racks results, therefore, in the movement apart of the two portions of the burners 74, so as to enable the mantles to be introduced. The said movement, is however, obtained by the fall of the treble rack P (Figs. 37 and 39) on to a rod 78 operating the spindle 77 by means of a drum 79 on which is wound a chain. A lever 80 secured by means of a rod 81 to the spindle 77, rotates the spindle 82 which carries the levers 75. The balance weight 83 is intended to insure the closing of the burners after the introduction of the mantles.

In case when the weight of the treble rack P is not sufficient, a special mechanism shown in Fig. 39, insures complete opening of the singeing rack N. A socket 84 carries a tenon 85 always in contact with a pin 86 secured to the spindle 77. Two arms 87 and 88 terminating in a tappet 89 which can be pushed back by a tenon 90 secured to the cam bar O, rotate about its axis socket 84 carrying the tenon 85.

In their movement toward the back of the machine, the rods 3 are guided by a rail 91 secured to the racks. The rods 3 which are provided at their bottom portion with a part 92 engaging with the rail 91, can, therefore, move along the latter without moving laterally. The rods 2 are also guided by a part 93 which slides on the part 94 secured to the upper portion of the rods 3.

*Working of the mechanism of the first singeing rack.*—The mantles, on leaving the station M, advance toward the first singeing rack N. At that moment the treble rack which will be hereinafter referred to, falls down, and by its portion 95 (Fig. 37) presses against the finger 78 which on being lowered, pulls a chain secured to the drum 79, which results in the spindle 77 being rotated. The latter spindle carries near its end a drum to which is secured a rod 81 which pulls a lever 80 and thus imparts to the spindle 82 a movement of rotation resulting in the oscillation of the finger 75. The said finger, on oscillating, brings about the movement of the two gas pipes 76 and 76', to which are secured the burners 74. The burners 74 consisting of two identical parts, secured one to the pipe 76 and the other to the pipe 76', are therefore, forced to move apart, so as to enable the mantles to be introduced into the circle formed by the connection of the two parts of the burners 74. The said burners are designed so as to reach the upper portion of the mantles.

It could happen that the distance apart would be insufficient for affording passage to the guides of the mantles. In that case a special device shown in Figs. 37, 39 and 40, forces the burners to move completely away from each other. To the cam bar O is secured a roller 90 (Figs. 40 and 40ª), which on the said bar moving, strikes an arm 89 carrying a finger pivoted to the bar 87 and which, on turning about the point 95, drives a bar 87 secured to a socket 84 carrying a stop 85. The socket 84, on being rotated, drives by means of its finger 86 the spindle 77 which moves apart the burners. On the pressure of the treble rack P, or the action of the cam bar ceasing to act on the positive driving gear (Fig. 40), the burners move close together and inclose between their two portions the mantles which were introduced. This movement is effected by means of the balance weight 83 secured to the spindle 82, which on resuming its original position, brings the finger 75 back to the point of closing of the burners. On an advance movement of the mantles similar to that described, taking place, the mantles are disengaged from the burners 74 and are successively brought into the positions M′ and M″, and then to the second singeing rack N′.

*Mechanism and working of the second singeing rack.*—The second singeing rack N′ comprises the two racks proper 76″ and 76‴ operated by means of the same device as that operating the first singeing rack. The burners 74′ secured to the racks 76″ and 76‴, are arranged for singeing the mantles at the base, in the event of the first singeing proving insufficient. The said rack can be raised by means of screws 72 engaging with the support or bracket 72″ of the conduits 76″ and 76‴ driven by a chain passing over the toothed wheels secured to the end of the said screws. A finger 75′ effects the lateral movement of the conduits 76″ and 76‴. The working of this device is identical to that of the first rack, and the same spindle 82 (Fig. 37) controls the opening fingers 75 (Fig. 9) and 75′ (Fig. 15).

*Mechanism of the incinerating or treble rack.*—On coming out from the second singeing rack N′, the rods 2 and 3 carrying the mantles are brought above the incinerating rack P. The said rack (Figs. 19, 20 and 21) consists of three rows 97, 98, 99 of central burners 100, of which in the example illustrated there are thirty. Each of these burners is rotated by means of pinion 101 driven by pinions 102. The latter are secured to the spindles 103, 104 and 105 which receive their movement from the chains 106 and 107 traveling on the pinions 108, 109, 110 and 111. On the other hand, a pinion 112 keyed to the spindle 105, receives its movement from the pinion 113 keyed to the same spindle as the pinion 114 which in its turn receives its movement from another pinion 115. Against the pinion 115 (Fig. 22) is keyed another pinion 116 receiving its movement from the central spindle E by means of a pinion 117. The pinions 112, 113, 114, 115, 116 and 117 are connected together by chains.

The burners 100 are constituted by tubes which, owing to the lowering of the whole treble rack, can penetrate into the interior of the burners in order to incinerate them. A gas pipe 118 arranged at the bottom portion of each of the racks 97, 98, 99 feeds the burners 100. The height of the burners 100 is adjustable by means of two pinions 119 and 120 connected by a chain. Two screws 121 and 122 passing through the pinions 119 and 120 and held in the guide 123 secured to the treble rack, make the above regulation possible.

The mechanism used for raising and lowering the treble rack, is operated by the spindle E to which are keyed the cams 124 and 125. The cam 124 is intended, by acting on the roller 126, to raise the lever 127 which is pivoted at 128. On the lever 127 can slide a roller 129 held in a nut 130 adjustable by means of a screw 131 carried by the part 132. The part 132 is raised or lowered according to the movement of the cam 124, driving with it the treble rack P by means of the finger 133 brought into contact with the part 134 secured to the part 123 of the treble rack.

The cam 125 has for its object to support the treble rack P (Figs. 22 and 23), by means of a falling part 135 during the passage of the low portion of the cam 124 which at that moment releases the treble rack. The roller 136 arranged in the fork of the bottom portion of the falling part 135, forms an intermediate link between the said part and the cam 125, on the cheeks 137 on which it travels. The weight of the part 132 is balanced by the balance weights 138 and 139. Guide rollers 140 insure vertical movement of the part 132.

The regulation of the screws 131 at both sides of the machine is effected by means of toothed wheels 141 connected by a driving chain. A cam 142 secured to the cam bar O, has for its object to raise the lever 134 which, on releasing the part 133 brings about the fall of the rack. A balance weight 143 is also used for balancing the own weight of the treble rack.

*Working and mechanism of the incinerating rack.*—The mantles, on leaving the second singeing rack, are therefore, carried above the first burners of the treble rack P at the moment when the latter is stationary and at the bottom point of its travel, the cam 142 having brought about its fall by raising the arm 143 of the lever 134. The cam 125 supports the treble rack during the time required for the passage of the mantle supporting rods preceding those in question, by the part 123 resting on the heel 135' of the part 135.

On the mantle supporting rods being brought above each burner, the rack is raised by the action of the cams 124 125 which raise the frame 132 (Fig. 22). During that raising the lever 143 comes into engagement with the stop 133. The frame or lyre is therefore, in engagement with the top of the part 133 which secures it to the rack P by means of the part 123. The rack continuing to rise, the burners 100 penetrate into the guides for the mantles. Under the action of the rotation of the cam 124, the treble rack is raised and lowered until a disengagement takes place brought about by the stopping time mechanism on the arm 143. During the said rising and descent, the driving by the chain of the pinions 117, 116, 115, 114, 113, 112 imparts rotary movement to the burners 100, whatever be the position occupied by the rack. The above operation is repeated each time that the mantles are moved, in order to come above the two other racks of burners.

*Mechanism of the calcining and head burning rack.*—The rack for calcining and burning the heads (Figs. 24, 25 and 26) consists of burners 144 secured to the distributing pipe 145 vertically adjustable by the chain pinions 146, 147. Other circular burners 148 similar to those of the front singeing rack, are secured to the tubes 149 and 150 mounted on the fixed frames 151.

A spindle 152, driven by the spindle 77 (Fig. 39) by means of a chain 153 and pulley 79', rotates pulleys 154, 155. These pulleys, by means of a chain, lower the calcining rack which is brought back to its upper position by movable balance weights suspended to the pulleys 156 157.

The spindle 152, by means of a lever 158, rod 159 and a lever 160 secured to the spindle 161, operates the bifurcated balance beam 162 which drives the tubes 149 and 150 carrying the burners 148. The chain pulleys 146 147 move a cast iron cross-beam 163 supporting the fittings for the pipe 145 and the burners 144.

*Working of the mechanism of the calcining and head burning rack.*—The mantles coming out from the treble incinerating rack P, pass to the calcining rack N". At that moment the rack 163 carrying the burners 144 is at the bottom of its travel, and the rack of the circular burners 148 is open. On the mantles arriving above the burners 144, the pulleys 156, 157 under the action of the balance weights attached to them, raise the burners 144 which engage then with the guides for the mantles and penetrate into the interior of the latter. At the same time the burners 148 have closed again owing to the action of the same balance weights, by means of the fork 162 operated by the spindle 161 to which is secured the lever 160 driven by the rod 159 secured to the lever 158. The calcining being terminated, the spindle 77 (Figs. 29 and 39) controlled by the so-called "positive" drive (Fig. 40) gives to the rack 163 a movement downward by means of the chain 153 secured to the pulleys 79 and 79'; and at the same time forces the circular burners 148 to open under the action of the fork 162 controlled by the spindle 161 which itself rotates under the action of the lever 160 connecting rod 159 and lever 158, the latter being secured to the spindle 77.

*Mechanism of the knife rack.*—After the calcining, the mantles are carried to the knife rack. A cast iron cross-bar 164 (Figs. 27, 28 and 29) vertically adjustable by means of chain pulleys 165, 166 carries toothed wheels 167 engaging with partial tooth racks 168 supported on a part 169. The toothed wheels 167 are provided with a driving finger or tappet 170 provided with a rubber washer which engages with a tappet 171 secured to the knife spindle 172 terminating in the shape of a flange and carrying a blade 173. The tappets 171 are held in their cocked position by a disengagement bar 174 operated by the return backward of the cam bar O' by means of an adjustable bar 177 secured to the plate 178 and striking the finger 179 secured to the spindle 180.

The parts 169, or tooth rack holders, are operated by toothed wheels 175 176 by means of bars 181 of triangular shape arranged in the support 182 and held by chains 183 wound on wheels 184 secured to the toothed wheels 175 176. At the other end of the chains 183 is arranged a balance weight 185 which brings the tooth rack holders 168 to the bottom of the travel, the said tooth rack holders being guided by roller supports 186.

During the movement of the cam bar O forward, the double plates 178 seize at the passage the bar 181 and cock the knives 173. At the return of the cam bar O, the vertical bar 177 strikes the finger 179 and disengages the knives.

Between each knife-holder are arranged brush holders 187 terminating at the top in a double brush 188, the object of which is to remove from the mantle guides the waste due to the cutting, and falling into the hopper 181 where it is collected in a sliding drawer 190.

*Working of the mechanism of the knife*

*rack.*—At the passage of the mantles on the knife rack, the knives are cocked. The cam bars O O' turning back, bring about the disengaging movement by means of the bar 177 engaging with the finger 179 acting on the spindle 180 moving the locking bar 174 and thus releasing the fingers 171. At that moment the knives 172 come down under the action of the helical springs 191, the mantles are cut to a given height and continue their movement toward the brushes 181 which clean the mantle guides. The mantles continue then their movement to the central elevator. In moving forward, the cam bars again produce the cocking of the knives by means of the plates 178 which, on coming into contact with the bars 181, pull the chains 183 and give a rotary movement to the pinion 184, the result of which is that the tooth racks 168 are acted upon for moving them and bringing tappets 171 secured to the knife holders into engagement with the disengagement bar 174. At that moment the knives are again cocked for a second operation.

*Mechanism of the central elevator.*—The elevators S S' are similar to the front elevators and therefore need not here be described in detail. After having passed over the knife rack, the guide rods 3 come in front of the elevators S S' (Figs. 30 and 31) each provided with a head 192 secured to a guide 193 guided by a guide 194. A closing shutter 195 closed by a spring 196, forms a bridge for the rods 3 passing at the upper portion and going from the back to the front of the machine. An inclined plane 197 serves to cause the guide rod 2 to be released by the head of the elevator, by pushing back the carriage contained in the interior of the said head. The bar 193 receives its movement from the drums 198 and 199 secured to the cam bar O and to the rod 193 by means of chains.

A pawl device 200 brings the rod 3 into the head of the elevator. The pawl 200 is mounted on the pawl bar R which gives it a continued reciprocating movement. A safety lock 201 stops the rod 2 by means of the screw 202. Another pawl 203 secured under the chain guide 204 and provided with a balance weight, stops the guide rod 3 before the separation to be effected by the pawl 200. A balance weight 205 brings the head of the elevator back to the bottom guide.

*Working of the mechanism of the central elevator.*—The pawl bar R engages by means of the pawl 200, with the rod 3 in the elevator. At that moment the cam bar O, owing to its movement forward, raises the rod 193 of the elevator which slides on the bar 194, and brings the rod 3 to the upper guide, bringing about the opening of the shutters 195 which are afterward closed again by the spring 196. The head of the elevator having been moved by the cam surface 197 immediately after the closing of the shutters 195, releases the rod 3 which is level with the opening of the upper guide K. The rod 3 is brought back to the front by the contact with the rod 2 arranged at the back of the same, in the slide K, and coming from the back of the machine.

While the elevator is at the top of its travel, the chains I I' drive the rod 2 arranged on the bottom guide K' and make it pass through the central elevator in order to stop it at one of the cooling positions $M'''$, $M^4$. In its movement of ascent, the elevator has released the lever 206 which, owing to the action of the balance weight 207, has released the rod 2. The latter is then driven by the chain I. During the movement of the chains I I' driving the rods, the pawl 203 keeps the next rod 3 which otherwise could engage under the head of the elevator before its complete descent.

*Mechanism of the collodion rack.* (Figs. 32 and 33.)—After having remained for a certain time in the stations $M'''$ $M^4$ for bringing about the cooling of the suspension hooks, the mantles arrive above the collodion rack consisting of a box 208 in the shape of a trapeze, in which are inclosed vessels 209 carried by a cross-bar 210. The vessels 209, the number of which in the present example is ten, are connected together by a glass pipe or conduit 213 into which collodion penetrates at 211 and the overflow from which escapes at 212. The emptying of the vessels is effected at 214. The box 208 is surmounted by a second movable box 215, intended to retain the vapors disengaged by the dipping, which vapors are drawn in by the fan Z by means of nozzles 216 and piping Y. The rising movement of the whole is produced by the spindle F which raises the elevation part 217 by means of the roller 218 by means of the cam 219. The part 217 is guided by the parts 220 and 221. The part 222 supporting the box 208, is also guided by the parts 220 and 221. The box 208 is balanced by means of balance weights 223 held by a chain 224 secured to the roller 225. The box 208 is secured to the part 222 by an angle iron 226. The double box 215 is guided by the rods 227 and held in suspension by the balance weight 228 by means of the chain 229 secured to the roller 230.

A stop 231 (Fig. 33) secured under the bottom guide K', brings about the disengagement by acting on the balance weight lever 232 used for disengaging the double box 215 during the time occupied by the ascent of the latter and the dipping of the mantles.

A connecting rod 233 connected to the rod 227, lowers the double box by means of a lever 234 brought into contact with a cam 235 carried by the cam bar O and acting on a roller 236 (Fig. 1). The balancing of the whole is obtained by means of the balance weight lever 237 secured to the spindle F.

A pawl 238 pivoted at 239, is secured to the cam bar O. Two other pawls with balance weights 240 and 241 rest on the pawl 238 and are secured to the part 222. The pawl 240 is used for bringing into engagement the part 222 with the raising part 217. The pawl 241 brings about the engagement of the collodion box 208 with the part 217 on the return back of the cam bar O by means of a projection 242 on the lever 238.

*Working of the mechanisms of the collodion rack.*—On the mantles being brought above the collodion rack the double box 215 was lowered by the movement of the cam bar O forward, and brought into engagement with the box 208 by means of balance weight levers 232. This movement is brought about by means of the bar 234 which comes into contact by means of the roller 236 with the cam 235 of the cam bar. The connecting rod 233 being connected on the one hand to the bar 234, and on the other hand, to the rod 227 secured to the box 215, lowers the latter into the interior of the box 208 in order to enable the mantles to be introduced.

The pawl 238 having released, during its movement forward, the balance weight levers 240 and 241, the lever 240 comes into contact with the elevation part 217 operated by the cam 219 and the roller 218, and causes it to rise carrying the boxes 208 and 215. At that moment the mantles are dipped into the interior of the vessels 209 where the soaking with collodion takes place.

The box 208 having arrived to the highest point of its travel, brings about the disengagement of the double box 215 by means of a lever 232 brought into engagement with the stop 231. The double box 215 remains suspended by the balance weight 228. The cam 219 continuing to rotate, the box 208 descends until it rests on the leather washer 243. On arriving at that point, the pawls 240 and 241 come into contact with the lever 238, and disengage the part 222 from the elevation part 217.

*Mechanism for disengaging the mantle carrying rods from the chain.* (Figs. 34 and 35).—A rod V operated by the cam bar O by means of a cam 244 is used to raise a grip 245 carrying the rods 2 from the end 246 of the bottom guide K' to the end 247 of the same guide, the points 246 and 247 being at different levels. A pivoted arm 248 keeps the bar V in its direction of movement. A pawl 249 secured to the pawl bar R, advances the rods 2 in the guide 247.

*Working of the mechanism for disengaging the rods from the chain.*—On leaving the collodion station, the mantle carrying rods 2 arrive at the head 245 of the elevator V. At that moment, the cam bar O brings about the rise of the rod V by means of a cam surface provided on the cam 244. At the moment when the rod 2 arrives at the level of the guide 247, the pawl 249 which is carried forward by the pawl bar V, engages on its return with the rod 2 in the guide 247 (Figs. 34 and 35). Beginning at that moment, the rods 2 push each other into the interior of the drying chamber U. Gas racks 250 and 251 arranged below, heat the interior of the driving chamber U in order to insure the drying of collodion on the mantles. This device could, however, be replaced by a steam radiator.

*Mechanism of the back elevator.*—The back elevator X (Fig. 36) comprises a rod 252 carrying at its upper portion a head 253 with which engages a rod 2. The rod 252 is driven by the cam bar O by means of drums 254 and 255 to which are secured the chains connecting them. The upper portion of a shutter 256 forms a bridge for the rods 2, which are waiting for their admission into the upper guide K (Fig. 1). A double pawl 257 operated by the pawl bar R, engages with the rods 2 in the head 253 of the elevator. A locking pawl 258 keeps the rod 2 engaged with the head, in its position.

*Working of the mechanism of the back elevator.*—The rods 2 pushed by each other, stop at the station arranged at the end of the travel of the pawl 257, which on returning forward, being pulled by the pawl bar R, becomes engaged with the recess of a rod 2 which it brings into engagement with the head of the elevator X.

The pawl 258 having been lowered for allowing the rod 2 to pass, it is again raised in order to maintain it. At that moment the mantles coming out with their back portion from the drying chamber U, are unhooked and placed into tubes. The cam bar O moves forward and gives a movement of rotation to the drums 254 and 255 which raise, by means of chains, the rod 252 carrying the head 253 into which is placed the rod 2.

The lugs of the rods 2, in their upward movement, bring about the opening of the shutters 256 held by the spring 259. On arriving toward the end of its travel, the head 253 releases the rod 2 under the action of the cam face 260, and at the same time the driving chain I drives, by means of one of its tappets, the rod 2 toward the front of the machine.

*Gas distributing mechanism.*—A pipe 261 on which is arranged a sluice valve 262, leads the gas from a tank where it is under pressure, to the different cocks of the device.

Rods 263, 264, 265, 266 and 267 which are pulled from the back toward the front of the machine, open respectively the cocks 268, 270, 272, 274, 276. The cock 268 enables gas coming from the pipe 261, to be supplied through the conduits 278, 281, to the circular burners 148 for burning the heads, by means of the conduit 308 and flexible hose pipes 269. The cocks 270, 272, and 274 supply the gas respectively to three series of rotating burners of the rack P by means of the flexible tubes 271, 273 and 275. The cock 276 mounted on the pipe 307, supplies gas to the burners 144 of the calcining rack N'' by means of flexible hose pipes 277.

The first singeing rack N receives gas direct from the piping 278 supplied by the pipe 261, the gas being distributed by means of the automatic cock 279. The gas arrives to the burners 74 through the pipes 76 and 76' by means of hose pipes 280. The second singeing rack N' receives the gas from the pipe 278. Cut-off cock 282 supplies gas to the burner 74' mounted on the tubes 76'' and 76''' by means of flexible tubes 283. Conduits 284, 286, 288 for a by-pass are provided respectively on the cocks 279, 285, 287.

A lever 292 provided with a roller 293 engaging with the groove 294 of a cam 289 mounted on the spindle E and secured to a toothed wheel 290 engaging with a worm 291 secured to the spindle C, controls the opening of the cock 285. This cock is balanced by a balance weight 295. At the end of the lever 292 is arranged a shackle 296 through which passes a screw-threaded rod 297 sliding in the socket of the said shackle when the latter rises, and at the moment when the cock 289 is paralyzed by the mechanism operated by the fall of the treble rack. The lever 292 drives the rod 297 in its downward movement by means of nuts 298, which brings about the re-opening of the cock 285.

A lever 299 secured to the rod 297 is provided at its end with a recess 300 with which engages the roller 301 of the balance weight lever 302 controlled by an adjustable part 303 secured to the parts 123 (Fig. 23) used for raising the treble rack P.

An adjustable part 304 secured to the part 303, on rising, raises the roller 305 secured to the end of the lever 302 and brings about the disengagement of the lever 299 by means of the roller 301, lever 309 and spindle 310, which enables the balance weight 295 to re-open the cock 285 by means of the chain 306. The cock 285 is adjustable.

The spindle 77 to which is secured the positive gear 85 (Fig. 39) brings about the movement of a lever 311 which operates a connecting rod 312 with a universal joint. The said connecting rod controls the end of the lever 313 which itself manipulates the cock 287. A lever 314 secured to the spindle 82 and driven by the balance weight 83, brings into action, a connecting rod 315 secured to the lever with a projection 316 mounted loose on the spindle 317. The result of that movement is that the cock 279 is again opened by means of the spindle 317 and the balance weight lever 318, when the racks N, N' and N'' are closed.

The stopping time tooth rack 10 arranged at the right hand side of the machine, is provided with an adjustable key 319 which comes into contact with a loose projection or finger with a balance weight 320 secured to the spindle 321. The finger 320 brings into action the lever 322 which transmits its movement by means of the connecting rod 323 to a lever 324 with ratchet teeth or pawls operating the lever 325 secured to the spindle 317. A pawl 326 keeps the lever 325 in that position corresponding to the closing of the racks N, N' and N''.

At the moment of the disengagement of the finger 320 from the stop 319, the lever 327, by means of its balance weight 328, brings back the lever 322, the rod 323 and the lever 324 to their position. A spring 329 serves for deadening the fall of the balance weight 328.

*Working of the gas distributing mechanism.*—On the mantles departing from the hooking station (Fig. 1) the burners of the different racks are burning only through by-passes, the rods 263, 264, 265, 267 being pulled forward and the cocks 268, 270, 272, 274 and 276 opened. The mantles pass between the circular burners of the first rack N which close over them. At that moment, gas is supplied to the burners in large quantities. The racks N, N', and N'' on closing, drive the lever 314 and the connecting rod 315, and move the lever 316 with the projection, which comes into contact with the lever 325 which raises the pawl 326, and by the action of the balance weight 318, brings back the spindle 317 to the position for opening the cock 279. During that time, the tooth rack 10 of the stopping time device H rises, tooth by tooth, until the stop 319 comes into contact with the finger 320 and brings about the closing of the cock 279 carrying with it the lever 322, the balance weight 328, the lever 327, the connecting rod 323 and the lever with ratchet teeth or pawls 324, which stops the lever 325 by means of the pawl 326. Afterward the lever 327 and the balance weight 328 return the device just described to its point of starting, that is to say, into the position in which the lever 327 rests on the spring 329. The singed mantles continue their travel toward the second rack N'. The additional singeing by means of the said rack being optional, the cock 282 can be opened and closed by hand.

In case the mantles were singed at the bottom portion, the movement would be effected automatically by means of the same device as for the first singeing rack. The mantles in continuing to advance arrive above the first series of burners of the treble rack, which at that moment is at the bottom limit of its fall, the rotating burners 100 burning only with the by-passes. On the upward movement of the rack P beginning the part 304 comes into contact with the roller 305 of the lever 302 which moves the spindle 310. On the end of the said spindle is mounted the lever 309 terminating in a roller 301 which becomes disengaged from the notch 300 of the lever 299, so that the cock 285 is re-opened by means of the chain 306 and the balance weight 295. During the upward and downward movement of the treble rack P, the cam 289 produces different intensities in the admission of gas, by means of its sinuous path 294 in which travels the roller 293 mounted on the lever 292. The latter with its end drives the rod 297 by means of nuts 298 and the shackle 296, and therefore, by means of the chain 306, brings about the variable closing of the cock 285. This movement continues until a new fall of the rack P takes place. The same operation is repeated for the two other racks of burners of the treble rack.

After their passage over the third rack, the mantles pass above the rack N'', the burners for burning the heads 148 of which are open, and the burners 144 lowered. The burners 148 close and give full gas to the mantles by means of the mechanism supplying gas to the first rack N, and the burners 144, of which only the by-passes are burning, penetrate into the interior of the mantles and give a strong flame by means of the mechanism for positive control (Fig. 39) which drives the lever 311, the connecting rod 312 with universal joint, and opens, by means of the lever 313, the cock 287. At that moment the mantles being completely calcined, pass to the collodion rack.

The starting and the stopping of the machine are effected by means of a bar 330 (Fig. 2) which can be operated either in front or at the back of the machine, and controls an engagement fork arranged on the friction device A which receives its movement from the motor.

If it were desired to make experiments with a limited number of mantles, cocks 331 331' (Figs. 9 and 10), 332 332' (Figs. 15 and 16) 333 333' 333'' (Figs. 19 and 20) the latter controlled by a handle 334 and a rod 335, and cocks 336, 336' and 337 (Figs. 24 and 25) make it possible, by closing them, to use only two burners, for instance out of the total of those fixed to each rack.

For the purpose of obtaining a perfect support of the mantles during the singeing and calcining, it is very advantageous to use a perforated part of clay, porcelain, glass or any other similar material, having a conical shape for engaging with the mantle at its base.

The said part $A^5$ (Figs. 41, 42, 43 and 44) is made of a slightly conical shape of clay, porcelain, glass or other similar material. It is provided inside with a collar $B^5$. The portion of the body of that part $A^5$ above the collar $B^5$ is provided with small holes $C^5$. The bottom portion is provided with larger holes $D^5$. Finally, the inner collar $B^5$ is itself provided with vertical holes $E^5$.

Owing to the arrangements of the part $A^5$ described, a perfect singeing of the mantles is insured, the air passing easily into the interior of the latter through the perforations. Finally, owing to the latter, calcining takes place in such manner that the mantles cannot stick.

It goes without saying that the respective dimensions of the perforations, and their number can vary.

Having thus described our invention, we claim as new and desire to secure by Letters Patent:

1. In a machine for making incandescent mantles, the combination of a frame having upper and lower guides, mantle carrying rods and guide-carrying rods movable in said guides, movable chains adapted to engage said rods and move them in said guides, means adapted to engage said chains to move them from the front to the rear of the machine, stopping-time mechanisms adapted to render the chain moving means intermittently operative or inoperative, front-elevators for moving said rods from the upper to the lower guides and central and rear elevators for raising said guide carrying rods and said mantle carrying rods respectively from the lower to the upper guides.

2. In a machine for making incandescent mantles, the combination of a frame, a chain carried thereon, carrying rods moved by said chain, continuously movable pawls adapted to engage and move said chain, means for moving said pawl to cause the same to move said chain, a reciprocating cam-bar, means operated by the movement of the cam-bar for moving said pawl into operative or inoperative position, an oscillating beam, a piece pivoted to said bar and adapted to engage said beam but normally out of engagement therewith, a vertically movable rack-bar, a movable pawl adapted to be operated by the oscillating beam to move said rack-bar upwardly with a step by step motion, means carried by said rack-bar for causing the pivoted piece to move into engagement with said beam when the upward limit of movement of the rack-bar is reached, and means for lowering said bar and disengaging said pivoted piece.

3. In a machine for making incandescent mantles, the combination of a heating chamber, lower guides passing through the heating chamber and having two different levels, mantle-carrying rods in said guides, a cam-bar having a slotted cam thereon, a vertically movable rod engaging the slot of the cam-bar, grips carried at the upper end of said vertically movable rods and adapted to engage the ends of the mantle-carrying rods and move them from the lower level to the upper level, and movable pawls for advancing the mantle carrying rods in the upper level.

4. In a machine for making incandescent mantles, the combination of a frame provided with guides, endless chains movable in said guides, a rotating spindle provided with an eccentric-pin, an eccentric rod on said pin, a pair of rotating drums, a chain bridge adapted to move parallel to said endless chain, a chain secured to said eccentric rod and wound about one of said drums, chains secured to said chain bridge and wound about the other drum, a spring-pressed pawl carried by the bridge and adapted to engage said endless chain, holding means adapted to hold the pawl out of engagement with the endless chain, a cam-bar and means operated by the cam-bar for causing said holding means to permit the pawl to move into engagement with the endless chain.

5. In a machine for making incandescent mantles, the combination of a frame provided with a guide, carrying bars in said guide, a reciprocating pawl bar, a balance beam fulcrumed at an intermediate point and pivoted at its lower end to said pawl bar, a slide or carriage pivoted to the upper end of said fulcrumed bar and movable parallel to said guide, and pawls carried by said carriage for moving said carrying-bars.

6. In a machine for making incandescent mantles, the combination of a stationary bar carrying pins, pieces fulcrumed on said pins, a pair of gas pipes pivoted to opposite ends of said pins respectively, burners comprising two parts secured each to said pipes respectively, a lever pivoted to said stationary bar for moving said pipes to cause said parts to move toward and away from each other, means for operating said lever, and means for passing mantles between said parts of the burner.

7. In a machine for making incandescent mantles, the combination of a frame having upper and lower guides, carrying-rods movable in said guides, a vertically movable rod, a head at the top of said rod adapted to receive said carrying-rods, normally closed shutters adapted to receive the ends of the carrying-rods therebetween as the same are moved from one guide to the other, said shutters having curved lower ends provided with grooves, fingers on the lower guide and projecting into said grooves, a reciprocating cam-bar, a pair of rigidly connected rotatable drums, chains passing from opposite ends of said vertically movable rod and wound around one of said drums, and a chain passing around the other drum and secured to said cam-bar.

8. In a machine for making incandescent mantles, the combination of a treble rack having three sets of burners, means for raising and lowering said rack, means for rotating said burners when said rack is raised, means for carrying mantles to said rack when the rack is lowered and for holding the mantles over the rack when the rack is raised, and hollow guides for holding the lower part of the mantles and receiving said burners when the rack is raised.

9. In a machine for making incandescent mantles, the combination of a mantle carrying means, guides adapted to project into said mantles, a rack over which said means said mantles and said guides are adapted to pass, circular burners mounted on said rack and comprising two parts adapted to be separated from each other, a central burner adapted to project within said guide, means for raising said rack to cause said circular burner to surround the mantle and said central burner to project into said guide, and means for closing the two parts of the circular burner about the mantles when said rack is raised.

10. In a machine for making incandescent mantles, the combination of a vertically adjustable knife rack, vertically extending knife spindles supported on said rack, knives pivotally mounted at the top of said spindles, springs for moving said knives in one direction, a reciprocating cam-bar, means operatively connecting said knives and said cam-bar for cocking said knives, means for passing said mantles adjacent to said knives, means for releasing said knives when said mantles are brought adjacent thereto, and means for brushing off the mantles after they have passed the knives.

11. In a machine for making incandescent mantles, the combination of a frame having vertical guides and a drive shaft thereon, a double cover box comprising an upper and a lower box both slidable on said guides, a cam on said drive-shaft for raising said upper and lower boxes, collodion vessels in said lower box, means for holding said upper box spaced above said lower box after said lower box is raised and lowered, means for carrying mantles to and from the space between said upper and lower boxes when the same are held in spaced relation and holding them in said space when said lower box is raised, and means for permitting said upper box to be lowered after said mantles have been moved away from said space.

12. In a machine for making incandescent mantles, the combination of a guide for holding the mantles during the singeing and calcining process comprising, a conical piece of resistant material having an axial opening therethrough forming a thin wall, and an inwardly projecting collar or flange within said wall and provided with perforations, said wall being provided with perforations above said collar and larger perforations below said collar.

In testimony whereof we have signed this specification in the presence of two subscribing witnesses.

JOSEPH BONNET.
JEAN LEON MULLER.

Witnesses:
EMILE LEDRES,
H. C. COXE.